United States Patent
Kumar

(10) Patent No.: US 11,551,226 B2
(45) Date of Patent: Jan. 10, 2023

(54) SYSTEMS AND METHODS FOR DYNAMIC IDENTITY DECISIONING

(71) Applicant: Trans Union LLC, Chicago, IL (US)

(72) Inventor: Bala K. Kumar, Chicago, IL (US)

(73) Assignee: TRANS UNION LLC, Chicago, IL (US)

( * ) Notice: Subject to any disclaimer, the term of this patent is extended or adjusted under 35 U.S.C. 154(b) by 147 days.

(21) Appl. No.: 16/392,243

(22) Filed: Apr. 23, 2019

(65) Prior Publication Data
US 2019/0325449 A1    Oct. 24, 2019

Related U.S. Application Data

(60) Provisional application No. 62/661,519, filed on Apr. 23, 2018.

(51) Int. Cl.
*G06Q 20/40* (2012.01)
*G06F 21/44* (2013.01)
*G06Q 20/42* (2012.01)

(52) U.S. Cl.
CPC ......... *G06Q 20/4016* (2013.01); *G06F 21/44* (2013.01); *G06Q 20/4014* (2013.01); *G06Q 20/42* (2013.01)

(58) Field of Classification Search
CPC ............... G06Q 20/4016; G06Q 20/42; G06Q 20/4014; G06Q 20/3224; G06Q 20/385; G06F 21/44
See application file for complete search history.

(56) References Cited

U.S. PATENT DOCUMENTS

2009/0313134 A1* 12/2009 Faith .................. G06Q 30/0601
                                                            705/26.1
2012/0290939 A1* 11/2012 Yu ........................... G06F 21/36
                                                            715/741

(Continued)

FOREIGN PATENT DOCUMENTS

WO    WO-2014179690 A2 *  11/2014   ............. G06Q 10/10

OTHER PUBLICATIONS

The United States Patent and Trademark Office, International Search Report and Written Opinion in International Application No. PCT/US19/28766 (dated Aug. 5, 2019).

*Primary Examiner* — Patrick McAtee
*Assistant Examiner* — Vincent I Idiake
(74) *Attorney, Agent, or Firm* — William J. Lenz; Neal, Gerber & Eisenberg LLP

(57) ABSTRACT

Example systems and methods for dynamic identity decisioning include: receiving a request, from a third-party server, to confirm an identity of a user attempting a transaction through a third-party website displayed in a first application window on a user device of the user; causing the user device to display a second application window for presenting an identity decisioning application and at least partially overlapping the first window; assessing a risk level associated with the transaction based on identity verification data retrieved from the user device; and if the risk level exceeds a predetermined threshold, selecting at least one identity authentication exam for presentation to the user via the second window, determining an outcome of the at least one identity authentication exam based on a user response thereto, and determining an identity decisioning result based on the outcome; and presenting the result to the user via the second application window.

24 Claims, 13 Drawing Sheets

(56) References Cited

U.S. PATENT DOCUMENTS

| | | |
|---|---|---|
| 2014/0156515 A1 | 6/2014 | Bailey, Jr. |
| 2015/0046339 A1* | 2/2015 | Wong ................ G06Q 20/3829 705/71 |
| 2015/0066765 A1* | 3/2015 | Banks ................ G06Q 20/363 705/44 |
| 2019/0019192 A1* | 1/2019 | Kumawat .......... G06Q 20/4014 |
| 2019/0141021 A1* | 5/2019 | Isaacson ................ G06Q 50/01 |

* cited by examiner

U_Bank - Open a new Account http://u_bank.com/newaccount.html

Sign In | Home | Locations | Contact Us | Help search U_bank

OPEN ACCOUNT

Ms. Jane Doe, thank you for applying for a checking account with us today. Please answer the following questions to verify your details.

1. Which of these phone Numbers have you ever used previously?
   o 503-123-4567
   o 503-456-7890
   o 503-234-5678
   o None of the above 2. Which of these businesses are you associated with?
   o Apple Inc
   o Google
   o Microsoft
   o None of the above 3. In What County do you live?
   o Clackamas
   o Multnomah
   o Washington
   o None of the above

SUBMIT

Powered by TransUnion

SYSTEMS AND METHODS FOR DYNAMIC IDENTITY DECISIONING

CROSS-REFERENCE TO RELATED APPLICATIONS

This application claims the benefit of U.S. patent application Ser. No. 62/661,519, filed on Apr. 23, 2018, the contents of which are incorporated by reference herein in their entirety.

TECHNICAL FIELD

This invention generally relates to identity verification and/or authentication, and more particularly to systems and methods for dynamic identity decisioning for a user attempting to initiate a transaction from a remote device.

BACKGROUND

Identity theft is a growing concern, particularly in today's digital age. For example, many transactions, including commercial, financial, insurance-related, healthcare-related, and credit-related transactions, can now be completed online, with little to no personal interaction between the customer and an agent of the service provider or other transacting entity. For example, a user may be able to open a new bank account and/or a new credit card through a bank's website. As another example, a user may be able to set up an insurance policy (e.g., for auto, home, health, etc.) through the insurance company's website. In yet another example, a user may be able to request his/her credit-rating scores through a credit-rating agency's website. Such online transactions can be susceptible to identity theft because the service provider typically relies wholly on the information provided by the user in order to complete the transaction.

Many service providers and other transacting entities have adopted techniques for confirming the identity of a customer during a transaction, particularly when the customer is transacting from a remote location and/or using a remote device. However, commercially available techniques for identity verification and/or authentication can be time-consuming, costly, and cumbersome, at least because these techniques require large amounts of man hours for implementation and maintenance. For example, most existing techniques involve complicated programming code that a software programmer manually integrates into the service provider's existing website. And each time changes are made to the programming code, the software programmer manually updates the service provider's web site accordingly.

SUMMARY

The invention is defined by the appended claims. This description summarizes some aspects of exemplary embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

Systems and methods for dynamic identity decisioning are provided herein. One example embodiment includes a method in a server, the method comprising: receiving a request, from a third-party server, to confirm an identity of a user attempting a transaction through a third-party website, the third-party website being displayed in a first application window on a user device of the user; causing the user device to display a second application window for presenting an identity decisioning application, the second application window at least partially overlapping the first application window; assessing, by a processor, a risk level associated with the transaction based on identity verification data retrieved from the user device; if the risk level exceeds a predetermined threshold, selecting, by the processor, at least one identity authentication exam for presentation to the user via the second application window, determining, by the processor, an outcome of the at least one identity authentication exam based on a user response thereto, and determining an identity decisioning result based on the outcome of the at least one authentication exam; if the risk level does not exceed the predetermined threshold, determining the identity decisioning result based on the risk level associated with the transaction; and presenting the identity decisioning result to the user via the second application window.

Another example embodiment includes a server in network communication with a third-party server and a user device, the server comprising: a memory configured to store a program code; and a processor in communication with the memory and configured to execute the program code, the program code for: receiving a request, from the third-party server, to confirm an identity of a user attempting a transaction through a third-party website, the third-party website being displayed in a first application window on the user device of the user; causing the user device to display a second application window for presenting an identity decisioning application, the second application window at least partially overlapping the first application window; assessing a risk level associated with the transaction based on identity verification data retrieved from the user device; if the risk level exceeds a predetermined threshold, selecting at least one identity authentication exam for presentation to the user via the second application window, determining an outcome of the at least one identity authentication exam based on a user response thereto, and determining an identity decisioning result based on the outcome of the at least one authentication exam; if the risk level does not exceed the predetermined threshold, determining the identity decisioning result based on the risk level associated with the transaction; and presenting the identity decisioning result to the user via the second application window.

Yet another example embodiment includes A non-transitory computer readable medium comprising computer instructions embodied thereon to cause a processor to: receive a request, from a third-party server, to confirm an identity of a user attempting a transaction through a third-party website, the third-party website being displayed in a first application window on a user device of the user; cause the user device to display a second application window for presenting an identity decisioning application, the second application window at least partially overlapping the first application window; assess a risk level associated with the transaction based on identity verification data retrieved from the user device; if the risk level exceeds a predetermined threshold, select at least one identity authentication exam for presentation to the user via the second application window, determine an outcome of the at least one identity authentication exam based on a user response thereto, and determine an identity decisioning result based on the outcome of the at least one authentication exam; if the risk level does not exceed the predetermined threshold, determine the identity decisioning result based on the risk level associated with the transaction; and present the identity decisioning result to the user via the second application window.

Still another embodiment includes a networked computing system, comprising: a third-party server configured to host a third-party web site, the third-party server permitting a user transaction with the third-party website based on an identity decisioning result received in connection with the transaction; a user device configured to display a first application window for presenting the third-party website and to display a second application window for presenting an identity decisioning application, the second application window at least partially overlapping the first application window; and an identity decisioning server configured to host the identity decisioning application, the identity decisioning server comprising a processor configured to execute program code for: receiving a request, from the third-party server, to confirm a user identity associated with the user transaction; causing the user device to display the second application window upon receiving the request; assessing a risk level associated with the transaction based on identity verification data retrieved from the user device; if the risk level exceeds a predetermined threshold, selecting at least one identity authentication exam for presentation to the user via the second application window, determining an outcome of the at least one identity authentication exam based on a user response thereto, and determining the identity decisioning result based on the outcome of the at least one authentication exam; if the risk level does not exceed the predetermined threshold, determining the identity decisioning result based on the risk level associated with the transaction; and presenting the identity decisioning result to the user via the second application window.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. Further, in the drawings, like reference numerals designate corresponding parts throughout the several views.

FIGS. 4-10 illustrate exemplary interfaces associated with a dynamic identity decisioning application, in accordance with embodiments;

DETAILED DESCRIPTION OF PREFERRED EMBODIMENTS

Figure 1:
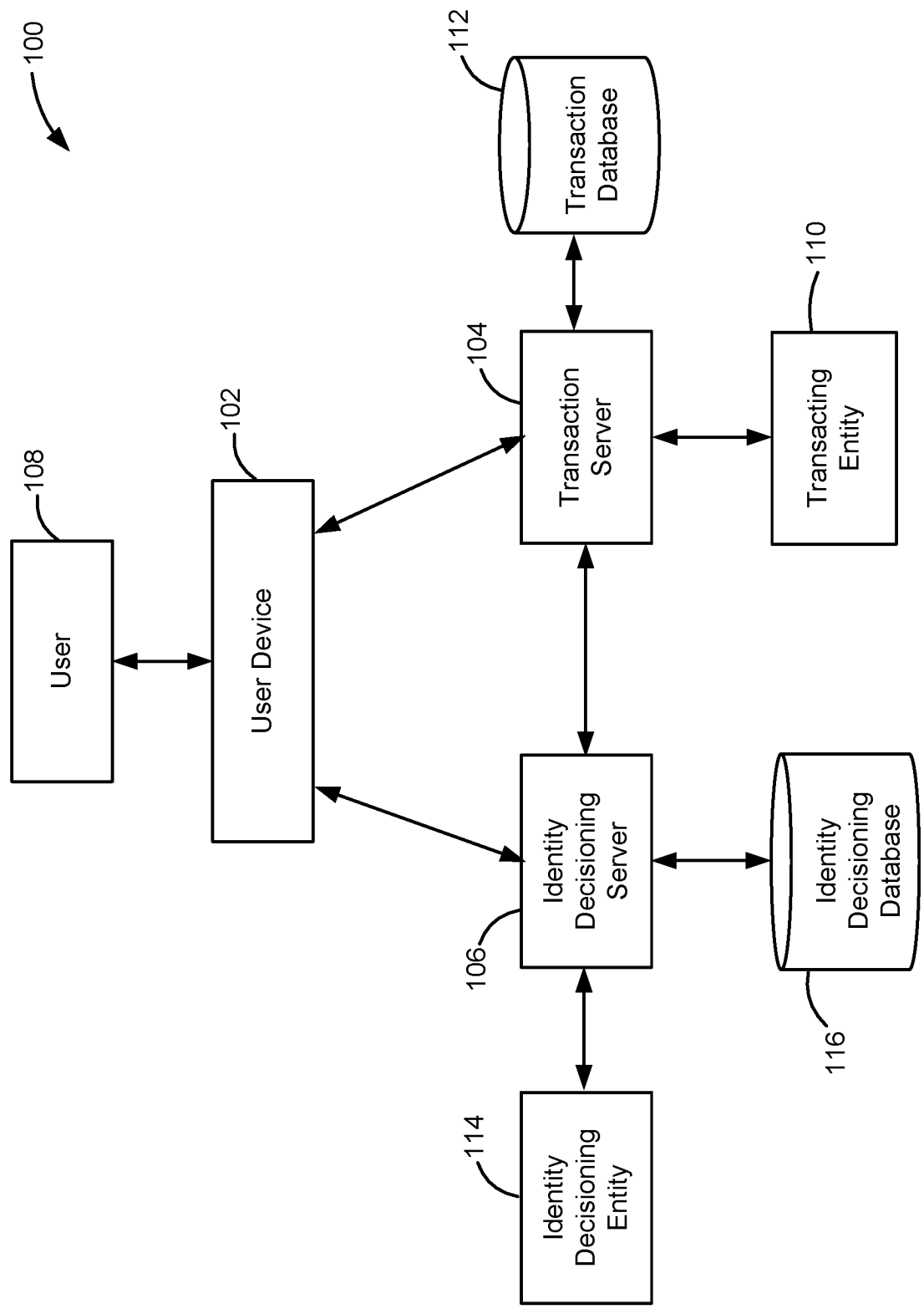
FIG. 1 is a block diagram illustrating an exemplary networked computing system for implementing dynamic identity decisioning techniques, in accordance with embodiments.

While the invention disclosed herein may be embodied in various forms, there is shown in the drawings and will hereinafter be described some exemplary and non-limiting embodiments, with the understanding that this disclosure is to be considered an exemplification of the invention and is not intended to limit the invention to the specific embodiments illustrated.

In this disclosure, the use of the disjunctive is intended to include the conjunctive. The use of definite or indefinite articles is not intended to indicate cardinality. In particular, a reference to "the" object or "a" and "an" object is intended to denote also one of a possible plurality of such objects.

In accordance with principles disclosed herein, systems and methods are provided for performing dynamic identity decisioning for a user attempting a transaction through a website operated by a transacting entity. According to embodiments, graphical user interfaces related to performing the identity decisioning can be presented to the user in conjunction with the attempted transaction, but the decisioning techniques can be performed or controlled by an entity other than the transacting entity. For example, an identity decisioning entity can offer contracts to third-party entities for implementing dynamic identity decisioning techniques in a manner that requires minimal involvement (whether programming, maintenance, or otherwise) from the third-party entity. In some embodiments, the identity decisioning entity can control the decisioning process through a dynamic identity decisioning application that is presented on the user's device upon receiving a request for identity decisioning from the transacting entity. The dynamic identity decisioning application can be presented without closing or leaving the transacting website, for example, within a second application window that at least partially overlays, or is embedded into, an initial application window presenting the transacting website.

According to embodiments, the identity decisioning techniques disclosed herein can be "dynamic" on several levels, including the ability to select, in real-time, successive decisioning technique(s) based on previously-completed decisioning and the ability to instantaneously configure the decisioning technique(s) for the individual user. For example, according to embodiments, the identity decisioning techniques can include at least two decisioning stages: an identity verification stage and an identity authentication stage. The results of the identity verification stage can be used to determine whether identity authentication is required, for example, depending on a transaction risk level assessed during the identity verification stage. In some embodiments, the identity authentication stage includes administering one or more dynamically-configured authentication exams, the number and/or type(s) of exams depending on the risk level of the transaction. As an example, in some embodiments, the types of authentication exams include knowledge-based authentication and one-time password authentication. According to embodiments, the identity verification stage can also include dynamically-configured decisioning techniques, such as, for example, device verification, user credentials verification, and personal identification verification. For example, according to some embodiments, the personal identification verification may be utilized only if passive verification and/or credentials verification are not successfully completed. Thus, the dynamic decisioning techniques disclosed herein enable a transacting entity to evaluate the identity of a user using a minimal, but effective number of decisioning tools.

Figure 13:
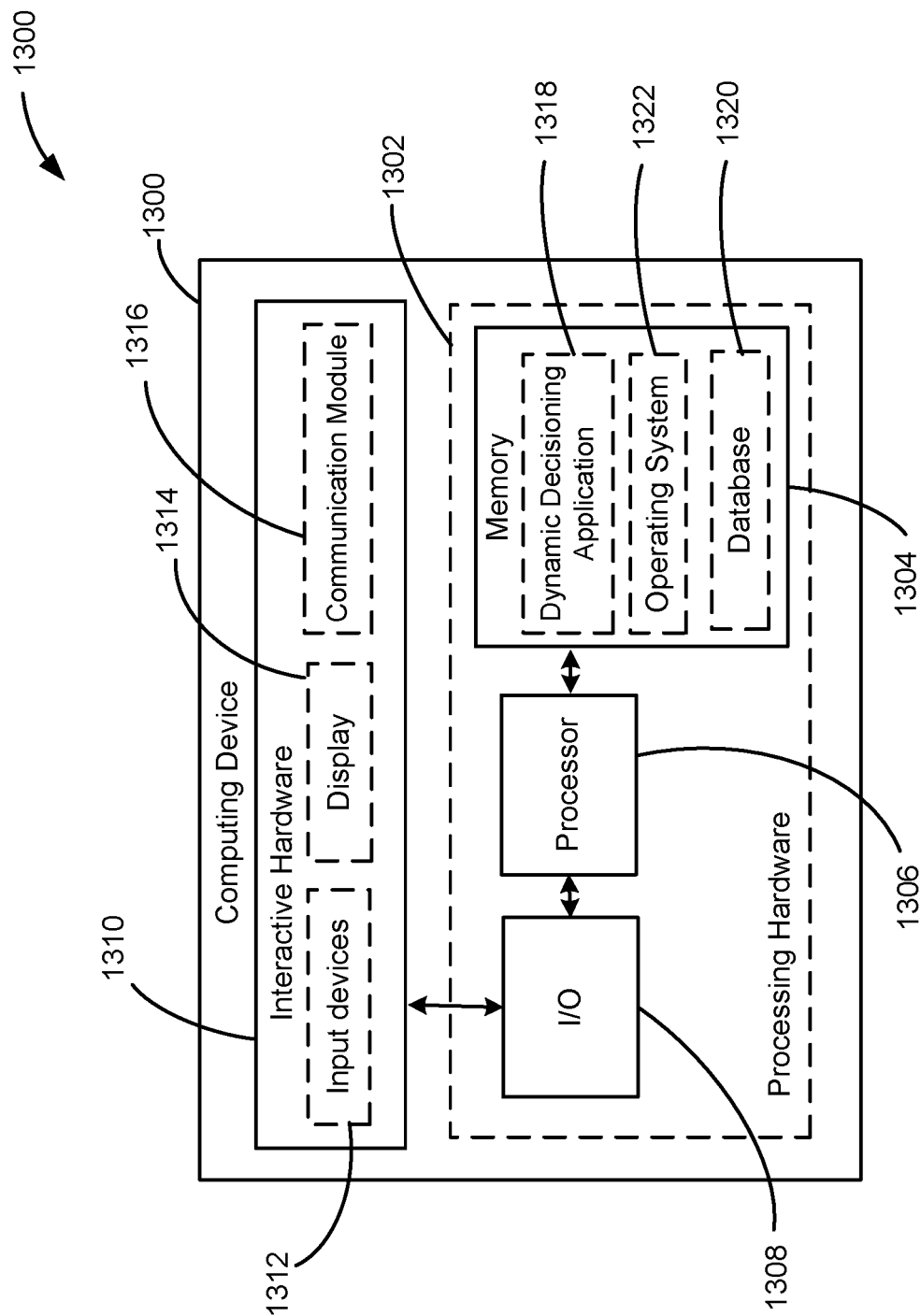
FIG. 13 is a block diagram of an exemplary computing device from the system shown in FIG. 1, in accordance with embodiments.

Referring to FIG. 1, a system diagram illustrates an embodiment of a computer-networked system 100 for implementing dynamic identity decisioning in accordance with one or more of the principles described herein. The system 100 may include modules and components that are connected through a network, such as the Internet, which can facilitate communications through secure channels. It should be appreciated that the system 100 is merely exemplary and can comprise fewer or more components and entities, as well as other various combinations of components and entities. Further, one or more components of the system 100 can be implemented using software executable by one or more computers (e.g., servers, personal computers, computing devices, mobile devices, etc.). An exemplary computer is shown in FIG. 13, as a computing device 1300, and will be discussed in more detail below.

As shown in FIG. 1, the system 100 comprises a user device 102, a transaction server 104, and an identity decisioning server 106. These components of the environment 100 can be communicatively connected to each other via one or more communication networks (e.g., the Internet). As an example, in some cases, the user device 102 and at least one of the transaction server 104 or the identity decisioning server 106 may be communicatively coupled to one another via a global network or a wide area network (WAN). In other cases, at least two of the user device 102, the transaction server 104, or the identity decisioning server 106 may be connected through a local area network (LAN).

As shown in FIG. 1, the user device 102 can be operated by a user 108. The user 108 can be any person or entity that wishes to carry out a transaction with a transacting entity 110 (to be discussed in more detail below). The transaction may include, for example, opening a new account, accessing an existing account, applying for a new credit card, applying for a loan, requesting insurance coverage (including auto, home, health, life, malpractice, etc.), taking a standardized examination, or any other action between the user and the transacting entity involving goods or services offered by the transacting entity. In some cases, the user 108 may be a pre-existing user (e.g., customer, member, etc.) of the transacting entity 110 and/or an identity decisioning entity 114 (to be discussed in more detail below). In other cases, the user 108 may be a new user of at least one of the transacting entity 110 or the identity decisioning entity 114. In embodiments, it should be understood that the device 102 can be any type of device, such as, for example, a notebook or desktop computer or any type of portable computing device, including a smart phone, a tablet device, a personal data assistant (PDA), or the like, comprising any type of hardware or software components, or combinations thereof.

In embodiments, the transaction server 104 can be communicatively coupled to a transaction database 112 configured to store existing user or customer information, previous transaction information, and any other information relevant to carrying out the transaction through the transaction server 104. While not shown in FIG. 1, in some embodiments, the transaction database 112 may be stored in a memory (not shown) of the transaction server 104. The transaction server 104 can be operated by, or affiliated with, the transacting entity 110.

In embodiments, the transacting entity 110 can be any type of business, institution, government agency, or other entity offering goods or services to the user 108, or otherwise capable of entering into transactions with the user 108. In some cases, the transacting entity 100 may be any type of entity that exchanges confidential, private, personal, or other sensitive information with the user 108 in order to complete a transaction and wishes to confirm the identity of the user requesting the transaction. For example, the transacting entity 110 may include an insurance company offering one or more types of insurance policies, including, for example, auto, home, accident, life, malpractice, and/or health insurance policies. As another example, the transacting entity 110 may include a financial institution, such as, for example, a bank, a mortgage company, a credit union, an investment company, or the like, that offer various types of financial accounts and/or services. In yet another example, the transacting entity 110 may include a credit reporting agency (e.g., TransUnion, Equifax, Experian, or the like) that can determine a user's credit-rating score(s). In a further example, the transacting entity 110 may include a healthcare institution or any other health-related entity (e.g., a hospital, a medical clinic, a pharmacy, a dental office, a physicians' office, or the like) that offers various medical services, sells prescription medicines and/or other medical products, and the like. In another example, the transacting entity 110 may include a testing facility or educational institution that administers electronic or paper examinations (including, for example, standardized examinations) and needs to validate an identity of the test-taker before beginning the examination.

According to embodiments, the identity decisioning server 106 can be operated by, or affiliated with, an identity decisioning entity 114. The identity decisioning entity 114 can be any company or business that provides identity decisioning solutions, including stand-alone software applications, programming code for incorporation into an existing application or website, and/or identity validation or confirmation services. The identity decisioning server 106 can be communicatively coupled to an identity decisioning database 116 configured to store identity information for a plurality of users, information pertaining to one or more identity decisioning techniques (e.g., pre-generated authentication exams, one-time password exam formats, knowledge-based questionnaires, verification questionnaires, etc.), or any other information relevant to implementing dynamic identity decisioning using the identity decisioning server 106. While not shown in FIG. 1, in some embodiments, the identity decisioning database 116 may be stored in a memory (not shown) of the identity decisioning server 106. In some embodiments, the identity decisioning database 116 may have a distributive architecture comprised of a number of computing devices communicatively coupled via a network (e.g., using cloud computing techniques).

The user device 102 can include a plurality of computer programs, including but not limited to, programs for receiving and processing information electronically transmitted by, and for electronically transmitted queries to, the transaction server 104 and/or the identity decisioning server 106. For example, the user 108 may interface with the user device 102 to initiate a transaction with the transacting entity 110 through, for example, a transacting website (see, e.g., FIG. 2, discussed below in more detail) hosted by the transaction server 104.

Likewise, the transaction server 104 can include a plurality of computer programs, including but not limited to programs stored within the database 112, for receiving and processing queries electronically transmitted from the user device 102. In some example embodiments, the transaction server 104 and/or the database 112 includes programming code associated with implementing the transacting website and user transactions associated therewith, and the user device 102 may communicate with the transaction server 104 in order to implement various functionalities of the transacting web site.

Similarly, the identity decisioning server 106 can include a plurality of computer programs, including but not limited to programs stored within the database 116, for receiving and processing queries electronically transmitted from the user device 102 and/or the transaction server 104. In some embodiments, the identity decisioning server 106 may execute a dynamic decisioning application for implementing the identity decisioning techniques disclosed herein. The user device 102 and/or the transaction server 104 may interact with the identity decisioning server 106 in order to execute various functionalities of the dynamic decisioning application (also referred to herein as the "identity decisioning application").

In some embodiments, the dynamic decisioning application may reside on multiple devices, such as, for example, the identity decisioning server 106 and/or various interface devices, for example, by being downloaded through the Internet or other network, or copied into memory on those interface devices through transport on a computer readable medium. For example, the user 108 may interact with the dynamic decisioning application through a user interface, and the transacting entity 110 may interact with the dynamic decisioning application through a transacting entity interface. These interfaces can be software programs designed to operate on respective interface devices and tailored to interact and exchange data with the dynamic decisioning application. These software programs can include mobile applications that can be executed on a smart phone, mobile device, or the like. In some embodiments, the interfaces can reside only on the identity decisioning server 106. In some embodiments, the interfaces can be standard web browser software programs, such as Internet Explorer, Firefox, Chrome, or Safari. In such embodiments, the user or the transacting entity uses the browser interface to interact with the dynamic decisioning application. Further, according to these embodiments, the dynamic decisioning application can be implemented as a website hosted by the identity decisioning server 106, or other computing device. As shown in FIGS. 4-10 and described below, in exemplary embodiments, the dynamic decisioning application may be implemented within a "pop-up" window that appears on top of, or overlays, the transacting website hosted by the transaction server 104 (e.g., as seen in FIG. 3), without replacing or closing the transacting web site.

Figure 2:
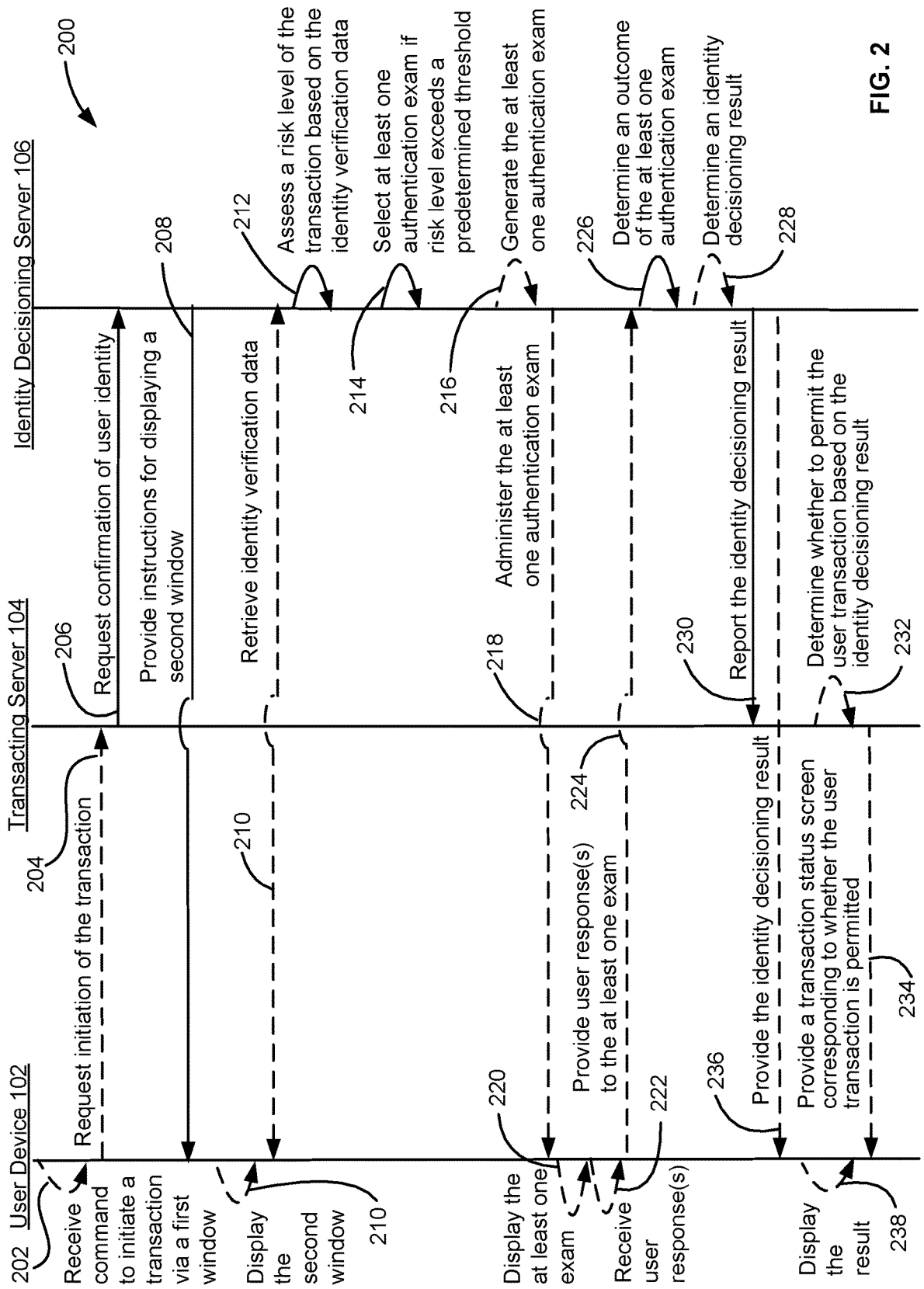
FIG. 2 is a diagram illustrating an exemplary sequence of interactions between the components of the system shown in FIG. 1 during the implementation of dynamic identity decisioning techniques, in accordance with embodiments.

FIG. 2 illustrates a sequence 200 of interactions between the user device 102, the transacting server 104, and the identity decisioning server 106 in accordance with embodiments. The sequence 200 may be associated with a method for dynamically confirming or evaluating an identity of a user (e.g., the user 108) that is attempting a transaction through a transacting website hosted by the transacting server 104. The sequence 200 can be implemented in software, firmware, hardware, or any combination thereof. In exemplary embodiments, the user device 102, the transacting server 104, and/or the identity decisioning server 106 may implement the functionalities depicted and described herein by executing an application stored on the user device 102, the transacting server 104, and/or the identity decisioning server 106. In some embodiments, the user device 102 may implement relevant portions of the sequence 200 by executing the application and interfacing with the identity decisioning server 106 and/or the transacting server 104. Likewise, the identity decisioning server 106 may implement relevant portions of the sequence 200 by executing the application and interfacing with the user device 102 and/or the transacting server 104. In some embodiments, the application is the dynamic decisioning application or a portion thereof. In some embodiments, the application includes at least a portion of a software application associated with implementing the transacting website. In some embodiments, the application may be a computer program stored on a non-transitory computer readable medium that is executable by a processor of one or more of the user device 102, the transacting server 104, or the identity decisioning server 106.

Referring additionally to FIGS. 3-10, the sequence 200 will be described herein with reference to the exemplary screenshots shown in FIGS. 3-10, where relevant. However, it will be appreciated that graphical user interfaces having other designs and/or functionalities may be used instead of, or in addition to, the illustrated screenshots according to the principles disclosed herein. The user device 102 can include a display screen (not shown, but see, e.g., FIG. 13) for displaying the graphical user interfaces described herein. The user device 102 can also include a user input device (e.g., touch screen, keyboard, mouse, trackball, joystick, keypad, etc.) (not shown, but see, e.g., FIG. 13) for providing inputs to the graphical user interfaces and otherwise interacting with the transacting website and/or the dynamic decisioning application.

Figure 3:
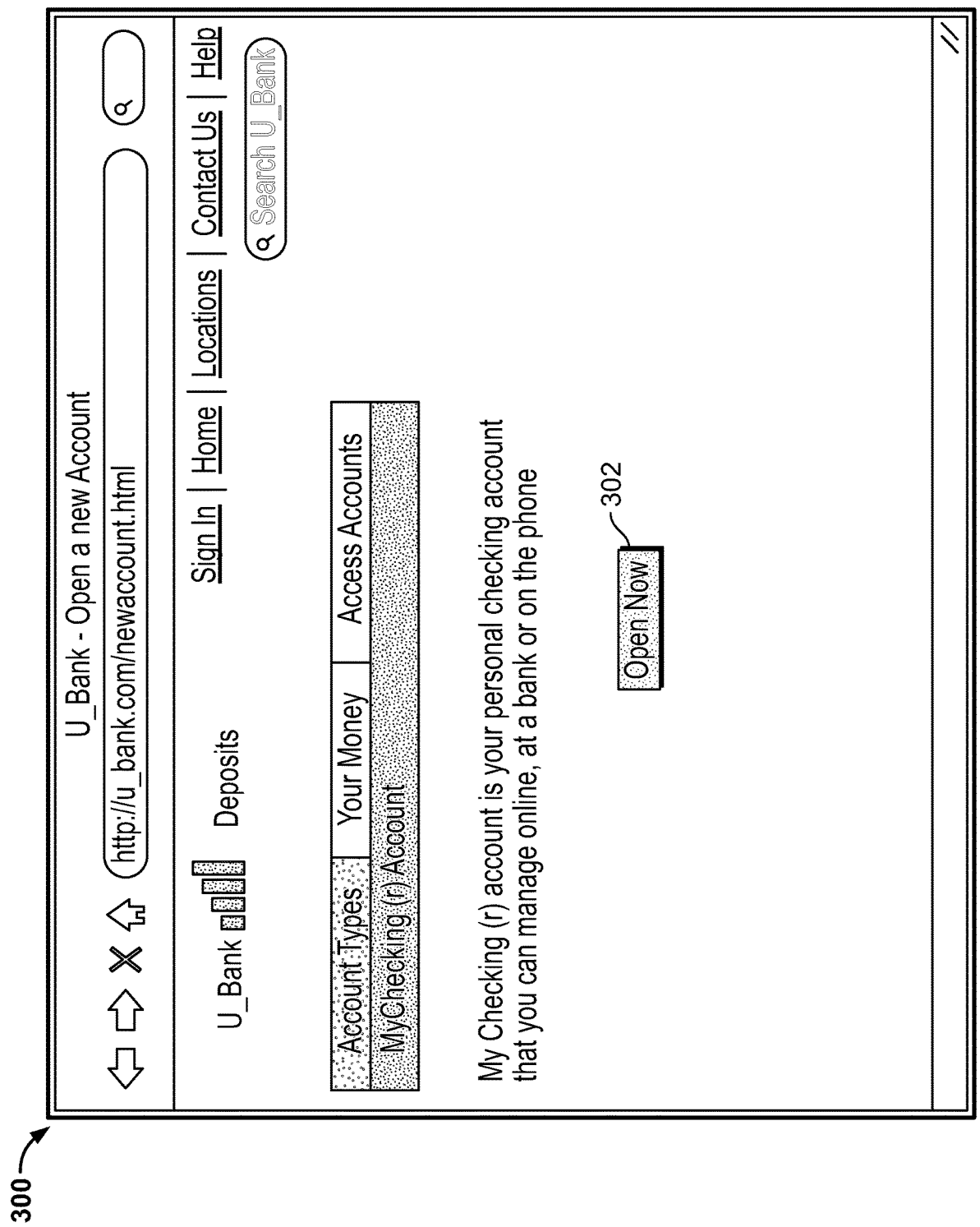
FIG. 3 illustrates an exemplary interface associated with a transacting website, in accordance with embodiments.

FIG. 3 illustrates a screenshot of an exemplary graphical user interface 300 associated with the transacting website hosted by the transaction server 104, and/or other computer device, in accordance with embodiments. In some embodiments, the transacting website may be implemented by executing a software application residing on the transaction server 104 and/or various interface devices, such as, for example, the user device 102. In some embodiments, the interface 300 resides only on the transaction server 104. In other embodiments, the interface 300 can be part of a standard web browser software program, such as Internet Explorer, Firefox, Chrome, or Safari. The data associated with the exemplary interface 300 can be transmitted to, received from, and/or synchronized with the transaction server 104 and/or other computing device.

In the illustrated embodiment, the transacting website is affiliated with, or operated by, a transacting entity "U_Bank." As shown, the interface 300 presents information about opening a new checking account with U_Bank to a customer (such as, e.g., the user 108) accessing the transacting website. Further, the interface 300 includes an "Open Now" option 302, which invites the customer to initiate an "open new account" transaction by selecting the option 302. In some embodiments, the interface 300 may additionally, or alternatively, display options related to other types of transactions offered by the transacting entity U_Bank, such as, for example, "apply for a loan," "apply for a credit card," "request a debit card," etc. Further, while in the illustrated example the transacting entity is a financial institution, it will be appreciated that the transacting website can be affiliated with any type of transacting entity, and the transaction initiated through user selection of the option 302 can be any type of action related to the goods and services offered by the transacting entity.

Referring back to FIG. 2, the sequence 200 includes receiving (202), at the user device 102, a command to initiate or attempt a transaction at the transacting website. As an example, the user may input the command (202) through the interface 300 by selecting the "Open Now" option 302 shown in FIG. 3. In response to receiving the command (202) and/or user selection of the option 302, the user device 102, or the interface 300, may send a request (204) to the transacting server 104 to initiate or enable the transaction. According to some embodiments, upon receiving the request (204), the transaction server 104 may automatically contact the identity decisioning server 106 to request (206) confirmation of an identity of the user attempting the transaction. In other embodiments, the transaction server 104 may first determine whether identity confirmation is required based on preliminary criteria. As an example, the preliminary criteria may include whether or not the user 108 and/or the user device 102 is recognized by the transacting server 104 as being associated with an existing customer account using readily-available or user-provided information (e.g., device identification information, a one-time password, a username and password, a pin number, a security code, etc.). In such examples, failure to satisfy the preliminary criteria may cause the transaction server 104 to request (206) identity confirmation from the identity decisioning entity 114.

In response to receiving the request (206), the identity decisioning server 106 may initiate an identity decisioning process for the user, for example, by executing all or a portion of the dynamic decisioning application described herein. According to embodiments, the identity decisioning process may be controlled or conducted by the identity decisioning server 106 with little to no input from, or communication with, the transacting server 104. For example, in some embodiments, upon receiving the request (206) from the transacting server 104, the identity decisioning server 106 may communicate directly with the user device 102 during the identity decisioning process. Once the process is complete, communication with the identity decisioning server 106 may cease, and the user device 102 may return to communicating directly with the transacting server 104.

In embodiments, in accordance with, or upon initiating, the identity decisioning process, the identity decisioning server 106 may provide (208) instructions, directly to the user device 102, for displaying one or more graphical user interfaces associated with the dynamic decisioning application (also referred to herein as "identity decisioning interfaces") on the display of the user device 102. In addition, the instructions may direct the user device 102 to present the identity decisioning interfaces within a second application window without closing or leaving the transacting website. In some embodiments, the instructions provided (208) by the identity decisioning server 106 include programming code that, when executed by the processor of the user device 102, causes the user device 102 to display the identity decisioning interfaces. In other embodiments, the instructions provided (208) by the identity decisioning server 106 may cause a portion of the dynamic decisioning application stored on the user device 102 to display the identity decisioning interfaces. In either case, the instructions may cause the user device 102 to display (209) the identity decisioning interfaces to the user, as shown in FIG. 2.

Through the identity decisioning interfaces (e.g., second application window 406, 506, 606, 706, 806, 906, and 1006, as discussed below), the identity decisioning server 106 may communicate and interact directly with the user device 102, and otherwise control the identity decisioning process with little or no communication with the transacting server 104. In some example embodiments, the identity decisioning interfaces can be configured using an Application Programming Interface (API) or similar protocols that enable the transacting website to interact or exchange information with the dynamic decisioning application, as needed, and/or to present the identity decisioning interfaces in conjunction with the transacting website to the user.

According to embodiments, the transacting website, itself, need not be altered in order to perform the identity decisioning techniques disclosed herein. More specifically, the identity decisioning interfaces may be operated, changed, or otherwise controlled independently of the transacting website, so that the transacting entity 110 can rely almost entirely on the identity decisioning entity 114 to fulfill its identity confirmation needs. For example, the dynamic decisioning application may be configured to enable the identity decisioning entity 114 to make changes to the identity decisioning interfaces without changing the underlying transacting web site. In some cases, the transacting entity 110 can integrate the dynamic decisioning application into the transacting website using a few lines of programming code provided by the identity decisioning entity 114. For example, in some embodiments, the identity decisioning interfaces may be HTML documents that are embedded into another HTML document associated with the transacting website, for example, as an Inline Frame (or "iFrame") element. In some embodiments, the identity decisioning application may be seamlessly integrated into the transacting website, but still controlled by separate servers/entities using one or more techniques, for example, as disclosed in U.S. Pat. No. 8,359,393, which is incorporated by reference herein in its entirety. In other example embodiments, the identity decisioning interfaces may be HTML documents that are provided in a "pop-up" window that appears on top of (e.g., overlaps or overlays) the transacting website. In either case, changes may be made to the HTML document, and uploaded to the identity decisioning server 106, without affecting the transacting web site or requiring additional programming on the part of the transacting entity 110.

Figure 4:
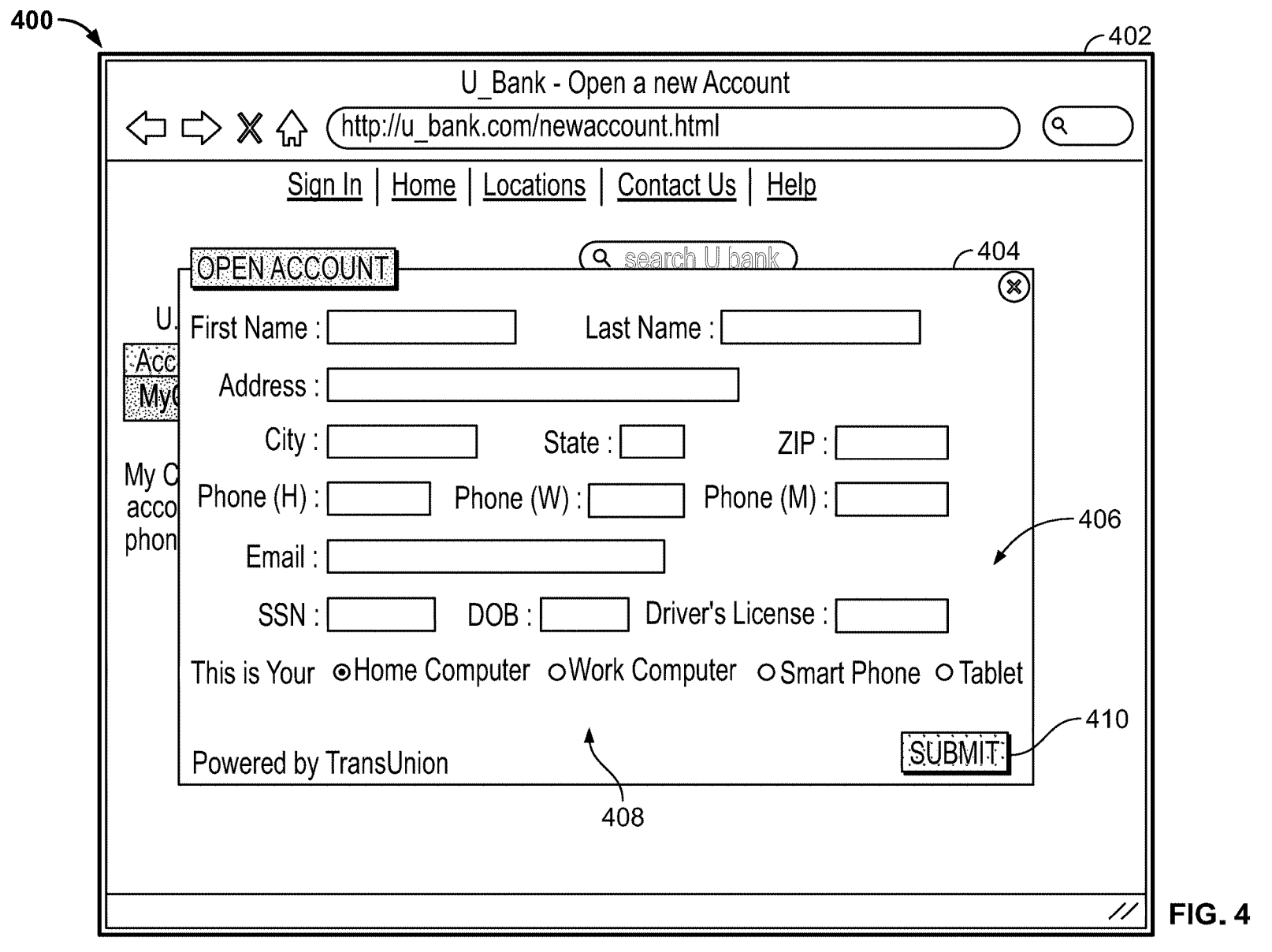

FIG. 4 illustrates a screenshot of an exemplary graphical user interface 400 comprising a first application window 402 for presenting the transacting website hosted by the transaction server 104, and/or other computer device, and a second application window 404 for presenting the dynamic decisioning application executed by the identity decisioning server 106, the user device 102, and/or other computer device, in accordance with embodiments. FIGS. 5-10 illustrate additional screenshots of the example graphical user interface 400 that may be generated by the dynamic decisioning application and presented by the identity decisioning server 106 during various stages of the identity decisioning process in accordance with embodiments.

As illustrated, the second application window 404 may be a smaller window that appears (or pops up) on top of the first application window 402, without closing or replacing the first application window 402. For example, as shown in FIG. 4, the second application window 404 may occupy a smaller portion of the interface 400 than the first application window 402, thus leaving portions of the first application window 402 exposed or visible around the edges of the second application window 404. In some embodiments, the second application window 404 may be implemented using an iFrame that is nested or embedded into the first application window 402. In such cases, the second application window 404 may be a frame that occupies, or overlays, a predetermined portion of the first application window 402.

According to embodiments, the underlying first application window 402 may be substantially similar to the interface 300 shown in FIG. 3 in terms of content and/or design. In some embodiments, the first application window 402 may remain unchanged (or frozen) until the identity decisioning process is complete. In other embodiments, the first application window 402 may display a message related to the identity decisioning process, such as, for example, "We appreciate your patience while we confirm your identity.", until the identity decisioning process is complete. In other embodiments, the second application window 404 can occupy the entire interface 400, such that the first application window 402 is no longer visible. In such cases, the first application window 402 may still remain open or active, albeit hidden by the second application window 404.

Presenting the windows 402 and 404 in at least an overlapping configuration within the interface 400 can help reassure the user that the dynamic decisioning application is an authentic extension, or affiliate, of the transacting website. In some embodiments, to further confirm the relationship, the second application window 404 may include logos, labels, or other signage that identifies an affiliation between the second application window 404 and the transacting website. For example, in the illustrated embodiment, the second application window 404 could display the U_Bank logo (not shown).

Referring back to FIG. 2, the sequence 200 can include the identity decisioning server 106 retrieving (210) identity verification data from the user device 102 in accordance with an identity verification stage of the identity decisioning process. According to embodiments, the identity decisioning process can include at least two stages: the identity verification stage and an identity authentication stage (to be discussed in more detail below). In some cases, the identity verification stage includes a number of layers for collecting different types of verification data. For example, the identity verification stage may include a passive verification layer for "passively" or automatically collecting information from the user device 102, a credentials verification layer for collecting login or credentials information from the user, a personal verification layer for collecting personally identifying information from the user, and other types of verification layers.

According to embodiments, the passive verification layer includes automatically retrieving passive information from the user device 102, for example, without requiring user input or intervention. In some cases, the identity decisioning server 106 may be configured to automatically request the passive information from the user device 102 without notifying the user, and the user device 102 may be configured to automatically provide the passive information upon receiving the request from the server 106.

In embodiments, the passive information includes device identification information, environmental parameters, or any other information that is related to, stored on, or otherwise obtainable by the user device 102 without notifying the user. The device identification information can include a unique or distinctive identification number assigned to each smartphone, tablet, or other handheld device by the device manufacturer (e.g., a Unique Device ID ("UDID") for Apple devices or an Android device ID for Android devices). In some embodiments, the device identification number (also referred to herein as "device ID") can be randomly or serially generated, depending on the manufacturer's preferences. In embodiments, the device identification information may be stored in a memory of the user device 102 and provided to the identity decisioning server 106 upon request. The environmental parameters can include location information (e.g., a location of the user device 102 when the command to initiate the transaction was received (202)), time and/or date information (e.g., a timestamp associated with receipt (202) of the command), or any other parameter(s) associated with the user and/or the user device 102 at the time of the transaction. In embodiments, the location information may be collected, and provided by, a GPS receiver (not shown, but see, e.g., FIG. 13) within the user device 102. The location information may include GPS coordinates, predetermined location names (e.g., home, work, school, etc.), or any other location-related information. In embodiments, the time and/or date information may be retrieved from an internal clock or calendar function of the user device 102. In some embodiments, the passive information further includes an IP address being used by the user device 102 to communicate with the transacting website.

According to embodiments, the identity decisioning server 106 may be configured to determine whether the retrieved passive information indicates suspicious behavior, for example, based on previously retrieved passive information and/or preset parameters. In some cases, the identity decisioning server 106 may be configured to label the transaction "suspicious" if the device ID and/or the location information do not match information previously retrieved in association with the user 108, where the user 108 is an existing customer of the transacting entity 110 and/or the identity decisioning entity 114. For example, the transaction may be considered suspicious if the current location associated with a given device ID does not match a previously-recorded location for the same device ID. As another example, the transaction may be considered suspicious if the device ID associated with a given user 108 (or username) does not match a previously-recorded device ID for the same user 108. Additionally, or alternatively, in some cases, the identity decisioning server 106 may be configured to label the transaction "suspicious" if the timestamp satisfies certain preselected parameters for identifying late night and/or very early morning activity (e.g., between 1:00 AM and 5:00 AM), unusually frequent activity (e.g., more than 3 transaction attempts within an hour), or the like. In some embodiments, the identity decisioning server 106 may determine that the transaction fails the passive verification layer if one or more items within the passive information appear to be suspicious. In other embodiments, certain items of passive information (e.g., device ID) may be weighed more heavily than other items (e.g., timestamp) when determining whether the transaction satisfies the passive verification layer.

According to embodiments, the credentials verification layer includes requesting login or other access credentials information from the user 108 through one or more of the identity decisioning interfaces. The login information may include a username and password associated with an existing account held by the user 108. In some cases, the account is associated with the dynamic decisioning application or the identity decisioning entity 114. In other cases, the account is associated with the transacting website and/or the transacting entity 110. In embodiments, the user 108 will not pass the credentials verification layer if the login information is incorrect or if the user 108 does not have an existing account (e.g., a new user, a deactivated user, etc.). In some embodiments, the dynamic decisioning application can be configured to allow a preset number of failed log-in attempts before labeling the user 108 as "suspicious," and/or determining that the user 108 has not passed the credentials verification layer. In some embodiments, one or more of the identity decisioning interfaces can be configured to display a "forgot password" option (not shown) and/or a "forgot username" option (not shown) if the user 108 that cannot recall his login information. In some cases, the dynamic decisioning application can be configured to classify selection of either "forgot" option as a failure of the credentials verification layer.

According to embodiments, the personal verification layer includes collecting personally identifying information ("PII") and/or other personal information from the user through one or more of the identity decisioning interfaces. In some embodiments, PII includes any information that can be used to distinguish or trace an individual's identity, such as, for example, name, social security number, date and place of birth, mother's maiden name, or biometric records (e.g., fingerprints, "voiceprint," retinal features, facial features, handwriting, etc.). In some embodiments, PII may further include any other information that is linked or linkable to an individual, such as medical (e.g., blood type, genetic information, etc.), educational (e.g., school name, graduation date, degree type, grades, etc.), financial (e.g., bank account number, credit card number, etc.), and employment (e.g., salary, job position, employer name, etc.) information. Other examples of PII can include a mailing address, a home address, an email address, a national identification number, a vehicle registration plate number, a driver's license number, telephone number, criminal record, race, gender, age, digital identity, etc.

Referring back to FIG. 4, the illustrated second application window 404 presents an exemplary PII interface 406 for requesting the user to provide or input personally identifying information. As an example, the PII interface 406 includes data entry fields for first name, last name, address, city, state, zip, home phone number, work phone number, mobile phone number, email address, social security number ("SSN"), date of birth ("DOB"), and driver's license number. It will be appreciated that the PII interface 406 is not limited to the format or content of the illustrated embodiment, and that any combination of personal information may be collected through the PII interface 406.

In the illustrated embodiment, the PII interface 406 also includes a device field 408 for manually identifying or naming the device being used to access the transacting website. As an example, the device field 408 includes user-selectable values for home computer, work computer, smart phone, and tablet. In some cases, the selected device value may be stored in the decisioning database 116 and used for conducting the passive verification layer during future transactions. In some cases, the device value selected at device field 408 may be stored in association with the device ID of the device 102 being used to access the transacting website. As an example, the next time the user 108 (or someone posing as the user 108) attempts to log into the transacting website, the identity decisioning server 106 can retrieve the previously-stored device value and compare it to any currently-retrieved passive information (e.g., device ID) to determine whether the user device 102 is familiar (and thereby, not suspicious) or unfamiliar (and thereby, suspicious).

The PII interface 406 further includes a submit option 408. User selection of the submit option 408 can send information entered into the PII data fields to the identity decisioning server 106. In some embodiments, this may complete the retrieve (210) interaction of the sequence 200. The identity decisioning server 106 may store the received information within the decisioning database 116. According to embodiments, the identity decisioning server 106 can compare the received information to previously-stored PII or other personal information associated with the user in order to determine whether the user has passed or satisfied the personal verification layer.

In the illustrated embodiment, the identity decisioning server 106 retrieves (210) the identity verification data, including the passive information, from the user device 102 after the identity decisioning interface is displayed (209) on the user device 102. In other embodiments, the identity decisioning server 106 may retrieve at least a portion of the passive information before providing (208) instructions to the user device 102 to display the second application window 404. In such cases, the identity decisioning server 106 may determine whether to initiate the identity decisioning process, and/or which stage(s) or layer(s) of the identity decisioning process are required, based on whether one or more items of passive information retrieved from the user device 102 appears suspicious. For example, the identity decisioning server 106 may first retrieve the device ID of the user device 102 to determine whether the device 102 is recognized and if it is, cause the user device 102 to display a credentials verification screen within the second application window 404. If the device 102 is not recognized (e.g., the user 108 is a new user or is using a new device), the identity decisioning server 106 may cause the user device 102 to display a different identity verification screen, such as, for example, the personally identifying interface 406, within the second application window 404.

In some cases, satisfaction of at least one of the verification layers is required to pass the identity verification stage. In other cases, the results of one layer can determine whether the identity decisioning process continues to the next layer within the identity verification stage. For example, in some embodiments, a failure to pass at least one of the passive verification layer or the credentials verification layer (e.g., a new or suspicious user) may trigger additional verification layer(s), such as, for example, the personal verification layer. In other example embodiments, regardless of whether the passive verification layer is successful, a failure to pass the credentials verification layer may automatically trigger or initiate the personal verification layer. In some cases, failure to satisfy a pre-selected one of the verification layers can cause the identity decisioning process to jump directly to the identity authentication stage. For example, failure to submit valid login information in the credentials verification layer can cause the identity decisioning process to continue to the identity authentication stage without completing the personal verification stage.

According to some embodiments, two or more individual verification layers may be conducted or initiated at the same time, or at least during overlapping time periods. For example, in some embodiments, the passive verification layer may be triggered immediately upon initiating the identify verification stage. At the same time, or while the identity decisioning server 106 retrieves and analyzes the passive information from the user device 102, an identity decisioning interface associated with the credentials verification layer may be displayed on the user device 102 to collect the login information. In some embodiments, the identity decisioning server 106 may analyze the results of both of these verification layers in order to determine whether an additional verification layer (e.g., the personal verification layer) is necessary. For example, the identity decisioning server 106 may cross-reference the user's login information to the retrieved passive information to determine whether the transaction appears suspicious (e.g., based on whether the provided username has been previously associated with the retrieved device ID and/or location).

Referring back to FIG. 2, according to embodiments, the sequence 200 further includes the identity decisioning server 106 assessing (212) a risk level of the transaction based on the identity verification data received or retrieved from the user device 102. As an example, possible transaction risk levels may include high, medium, low, and zero. It will be appreciated that other types of values may be used to represent the possible risk levels, including, for example, numbers (e.g., between 1 and 10), percentages (e.g., between 0% to 100%), other qualifiers (e.g., highly risky, risky, slightly risky, not risky), or the like.

According to embodiments, the identity decisioning server 106 can be configured to assess (212) or identify the risk level of the transaction based on the results of the identity verification stage. In some cases, the risk level may be assessed based on the overall outcome of the identity verification stage. For example, in some embodiments, if the user 108 passes the identity verification stage, the transaction may be considered to have low or no risk at all, and if the user 108 fails the identity verification stage, the transaction may be considered a high risk. In other cases, the risk level may be assessed based on the individual outcomes of one or more of the verification layers. In some embodiments, the number of verification layers having passing grades may determine the risk level assigned to the transaction. For example, if the user 108 passes all three verification layers, the transaction may be considered to have no risk. If the user 108 passes two of the three verification layers, the transaction may be considered a low risk. If the user 108 passes one of the three verification layers, the transaction may be considered a medium risk. And if the user 108 fails all three verification layers, the transaction may be considered a high risk. In other embodiments, the outcome of one or more of the verification layers may carry more or less weight in the risk assessment than the outcome of other layers. For example, in some cases, the risk assessment may be heavily influenced by the outcome of the personal verification layer. In one example embodiment, the transaction may be automatically labeled a medium risk if the user 108 fails the personal verification layer, and the risk level may be elevated to a high risk if the user 108 also fails one or more of the other verification layers.

According to some embodiments, the identity decisioning server 106 compares the assessed risk level to a predetermined threshold to determine whether further identity decisioning is required. In some embodiments, the identity decisioning server 106 is configured to determine that the user 108 has not satisfied, or has failed, the identity verification stage if the assessed risk level equals or exceeds the predetermined threshold. In such cases, the identity decisioning process continues to the identity authentication stage. If, on the other hand, the assessed risk level is lower than the predetermined threshold, the identity decisioning process may be complete, and continuation to the identity authentication stage may not be required. According to some embodiments, the predetermined threshold may be a risk level selected from the list of possible transaction risk levels. As an example, the predetermined threshold may be at least one of a low risk level or a zero risk level.

In some embodiments, the identity verification data includes two sets of data: initial verification data and secondary verification data, and assessing (212) the risk level of the transaction can include assessing a preliminary risk level based on the initial verification data, and assessing a secondary risk level based on the secondary verification data, if required by the preliminary risk level. In such embodiments, one or more of the identity verification layers are designated as initial verification layers and one or more of the remaining identity verification layers are designated as secondary verification layers. The identity decisioning server 106 can be configured to retrieve an initial set of verification data in accordance with the initial verification layer(s) and determine an outcome of each initial verification layer based thereon. The identity decisioning server 106 can be configured to assess a preliminary risk level based on the results of the one or more initial verification layers and compare the preliminary risk level to a preliminary threshold to determine whether further verification is needed, for example, through one or more secondary verification layers. According to some embodiments, the identity decisioning server 106 can be configured to request the secondary set of verification data in accordance with the secondary verification layer(s) if the preliminary risk level exceeds the preliminary threshold. The identity decisioning server 106 can determine or assess a secondary risk level for the transaction based on the secondary verification data, or more specifically, the outcome of the secondary verification layer(s). In such cases, the secondary risk level can represent the overall risk level assessed (212) for the transaction based on the identity verification data. In cases where the preliminary risk level is does not exceed the preliminary threshold, the preliminary risk level can represent the overall risk level assessed (212) for the transaction.

In one example embodiment, the one or more initial verification layers can include the passive verification layer and/or the credentials verification layer, and the initial set of verification data can include the passive information and/or the login information. And the one or more secondary verification layers can include the personal verification layer, and the secondary set of verification data can include the PII or other personal information. According to embodiments, the preliminary threshold may be at least one of a low risk level or a zero risk level. In some cases, the preliminary threshold may be a higher barrier than the predetermined threshold for determining whether the identity verification stage has been satisfied. For example, the preliminary threshold may be a zero risk level and the predetermined threshold may be a low risk level.

Referring back to FIG. 2, the sequence 200 further includes initiating the identity authentication stage by selecting (214) at least one authentication exam if the risk level of the transaction (also referred to as the overall risk level) exceeds the predetermined threshold. According to embodiments, the identity authentication stage includes a number of "exams" for testing the authenticity of the identity proffered by the user 108. As an example, the identity authentication exams may include at least one of a knowledge-based authentication exam that is based on information related to the user 108, a one-time password exam that involves a unique password provided to the user 108 through a user-selected channel, or other types of authentication exams that will be apparent to those skilled in the art. In some embodiments, the type of authentication exam selected (214) by the identity decisioning server 106 can depend on the risk level of the transaction. As an example, the identity authentication stage may be triggered if there is any risk associated with the transaction (e.g., the overall risk level exceeds the zero risk level), but the one-time password exam may be selected (214) for transactions having a low risk level, the knowledge-based authentication exam may be selected (214) for transactions having a medium risk level, and both types of authentication exams may be selected (214) for transactions having a high risk.

As illustrated in FIG. 2, in some embodiments, the identity decisioning server 106 can be configured to generate (216) the at least one authentication exam selected (214) by the server 106. For example, the identity decisioning server 106 may generate a random password to be used in the one-time password exam. As another example, the identity decisioning server 106 may generate a series of questions to be administered as the knowledge-based authentication exam, and may also generate a corresponding answer key to compare with user-provided answers. According to embodiments, the number and/or type of questions included in the knowledge-based authentication exam can be determined by the transacting entity 110 and/or by the identity decisioning entity 114. In some embodiments, one or more identity authentication exams can be pre-generated by the identity decisioning server 106 and/or other computer device and stored in the decisioning database 116 until requested for identity authentication. In some cases, only a portion of the pre-generated exam(s) may be presented to the user 108, depending on the number and/or type of questions required for the exam. In other embodiments, the identity authentication exams can be automatically generated, in real-time, during the identity decisioning process by the identity decisioning server 106 and/or other computer device.

As shown in FIG. 2, in some embodiments, the sequence 200 further includes the identity decisioning server 106 administering (218) the at least one authentication exam through the user device 102. In some cases, the sequence 200 can also include displaying (220) the at least one authentication exam on the display of the user device 102 in order to administer (218) the exam to the user 108. The sequence 200 further includes receiving (222) responses to the authentication exam from the user 108 at the user device 102 (e.g. via an input device of the user device 102), and providing (224) the user responses from the user device 102 to the identity decisioning server 106.

Referring now to FIG. 5, shown is an example knowledge-based authentication interface 506 presented by or within the second application window 404 according to embodiments. In the illustrated example, the authentication interface 506 presents a knowledge-based authentication exam comprising a plurality of questions 508 and a plurality of selectable answers 510 for each question 508. As shown in FIG. 5, the authentication interface 506 further includes a submit option 512 to enable the user 108 to submit or send a selected one of the selectable answers 510 to the identity decisioning server 106.

According to embodiments, the questions 508 and/or the answer 510 may be generated by the identity decisioning server 106, and/or other computer device, using information about the user 108 collected from one or more data sources such as, for example, the identity decisioning database 116, the transaction database 112, a government-run database (e.g., an vehicle registration database), a privately-run database (e.g., a credit history database), and/or any other database or data source comprising user information. As an example, the knowledge-based authentication exam may be generated based on the user's employment history (e.g., business names, dates of employment, and other information related to current and/or past employers), financial and/or credit history (e.g., information related to mortgages, loans, bank accounts, investment accounts, credit card accounts, etc.), residential or housing history (e.g., locations, dates of residence, and other information related to current and/or past residences), educational history (e.g., major/minor specializations, degrees, classes, graduation dates, matriculation dates, and other information related to current and/or past educational institutions of the user), vehicle history (e.g., make, model, year, and other information related to vehicles registered to the user), telephone records (e.g., phone numbers for current and/or past land lines and/or mobile phones), family history (e.g., names, ages, and other information related to the user's family members), social media history (e.g., information related to the user's activities using one or more social media accounts), web browsing history, and/or any other information about the user 108. It will be appreciated that the questions 508 and answers 510 shown in FIG. 5 (and FIG. 6) are merely exemplary and any of a number of other types of questions and/or answers may be included in the knowledge-based authentication exam.

In some cases, a number of the questions 508, themselves, may be pre-generated or "stock" questions that are typically included in a knowledge-based authentication exam. However, the answers 510 for each stock question may be "personalized" or generated based on specific information known about the user 108. In such cases, the answers 510 may be generated in real-time by the identity decisioning server 106, and/or other computer device, during the identity decisioning process. As an example, a knowledge-based authentication exam may be presented to each user 108 with the same question 508: "Which of these phone numbers have you ever used previously?," but the answers 510 presented by the interface 506 may be phone numbers specifically selected to include a correct answer for the user 108 and a number of incorrect answers that are (confusingly) similar to the correct answer.

Figure 7:
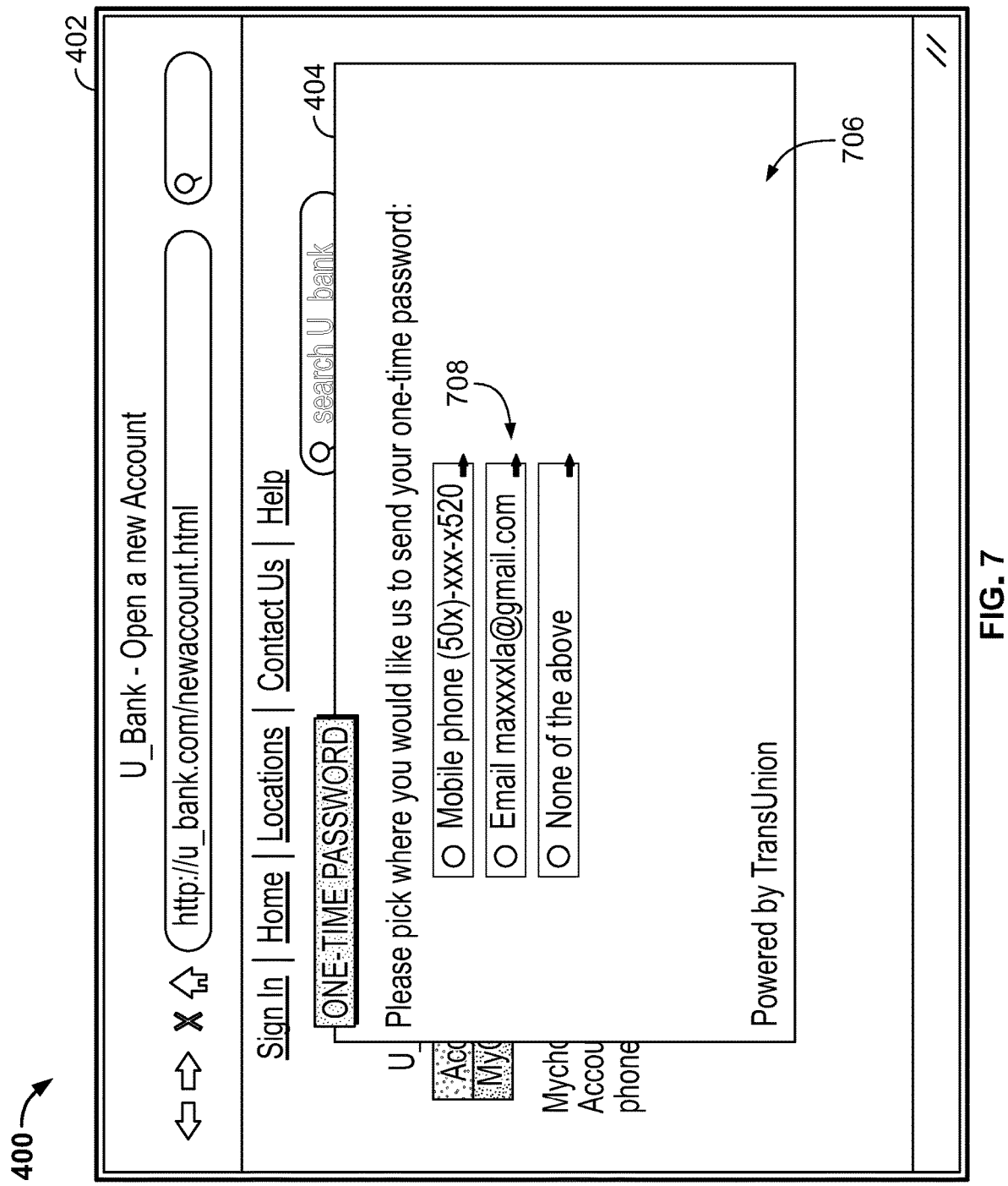
Figure 8:
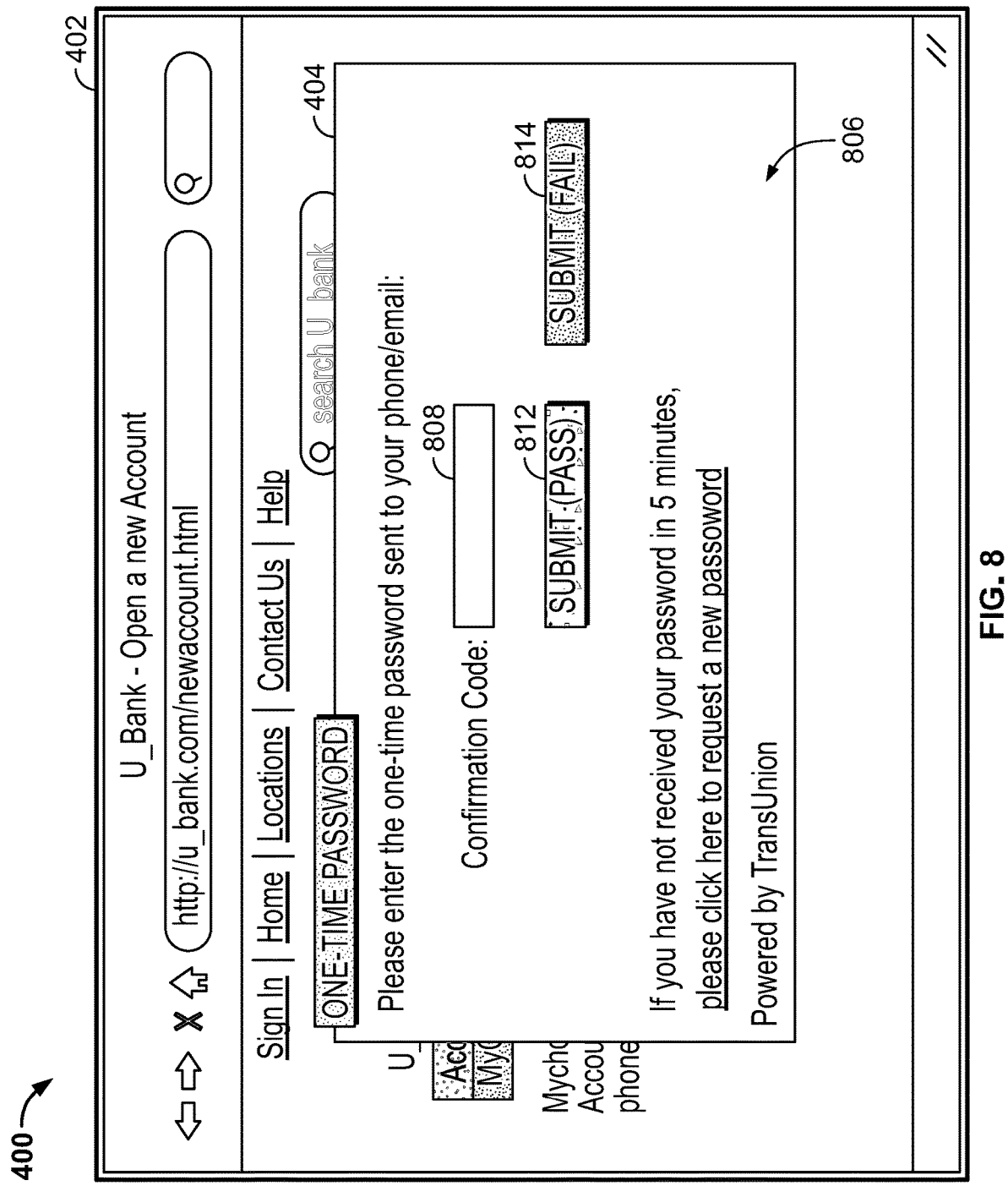

According to embodiments, the identity decisioning server 106 can be configured to administer or present one or more additional authentication exams, after completion of an initial authentication exam. For example, the additional authentication exam may be provided if the user 108 is unable to correctly answer at least one of the questions 508 in the knowledge-based authentication exam shown in FIG. 5. As another example, the additional authentication exam may be provided in conjunction with, or in addition to, one or more other authentication exams, regardless of whether the user 108 passed the initial authentication exam, for example, if the transaction is associated with a high risk. The additional authentication exam may be the same type as the initial authentication exam, or a different type of exam. In some embodiments, the type of additional authentication exam may depend on the outcome of the initial authentication exam. For example, if the user 108 passed the initial authentication exam, the additional authentication exam may be a one-time password exam (e.g., as shown in FIGS. 7 and 8). And if the user 108 failed the initial authentication exam, the additional authentication exam may be a knowledge-based authentication exam.

Figure 6:
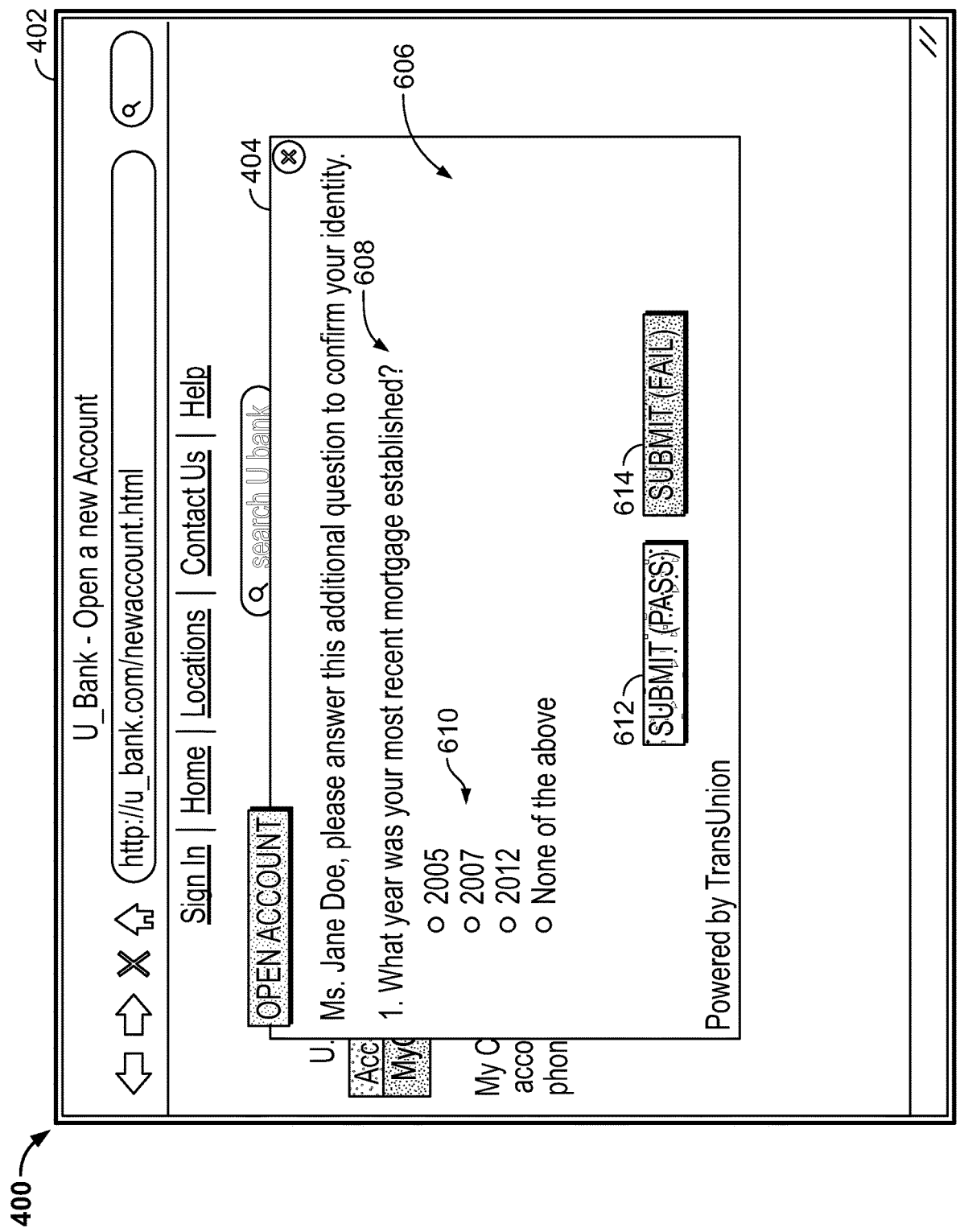

Referring now to FIG. 6, shown is an example additional authentication interface 606 presented by or within the second application window 404 in accordance with some embodiments. In the illustrated example, the additional authentication interface 606 includes a knowledge-based authentication exam comprising a single question 608 and a plurality of selectable answers 610. The additional authentication interface 606 can also include a submit option 612 to enable the user 108 to submit a selected one of the selectable answers 610 to the identity decisioning server 106. In other embodiments, the additional knowledge-based authentication exam may include a plurality of questions, similar to the knowledge-based authentication exam shown by the authentication interface 506 in FIG. 5. In still other embodiments, instead of a knowledge-based authentication exam, the additional authentication interface 606 may present another type of authentication exam, such as, for example, a one-time password exam (e.g., as shown in FIGS. 7 and 8). As shown, the interface 606 may also include a second submit option 614 for situations where the user 108 has not met an expected threshold required to pass the exam or otherwise fails to meet certain requirements to pass (e.g., selecting the correct answer 610). The second submit option 614 enables the user 108 to continue on to additional ways or opportunities to authenticate themselves, if available.

Referring now to FIGS. 7 and 8, shown are example one-time password interfaces 706 and 806, which are presented by or within the second application window 404 in accordance with embodiments. As illustrated, the one-time password interfaces 706 and 806 present different portions of a one-time password authentication exam. For example, the one-time password interface 706 may administer (218) a first stage of the authentication exam, the first stage being configured to obtain or determine a preferred method for delivering a password associated with the authentication exam to the user 108. And the one-time password interface 806 may administer (218) a second stage of the authentication exam, the second stage being configured to enable the user 108 to enter the password received via the preferred delivery method.

As shown in FIG. 7, the authentication interface 706 presents the user 108 with a plurality of selectable delivery options 708 and requests the user 108 to select one of the options 708. The selected delivery option 708 is then sent to the identity decisioning server 106. A content for each of the delivery options 708 may be selected based on PII and/or other personal information that is obtained from the user 108 through the PII interface 406, stored in the identity decisioning database 116 and/or the transaction database 112 (e.g., existing account information), and/or gathered from other sources containing information about the user 108 (e.g., a credit reporting database, an insurer database, etc.). In the illustrated example, the delivery options 708 include delivery to a mobile phone number associated with the user 108 (e.g., via a text, SMS, or voice message), delivery to an email address associated with the user 108 (e.g., via an electronic message), or "None of the above." As an example, the user 108 may select the "none" option if the displayed options 708 are not active, accurate, or preferred delivery methods (e.g., an out-of-service phone number or a deactivated email address). Selection of the "none" option may cause the user device 102 to display a new interface (not shown) that displays additional delivery options 708 and/or a data entry field for the user 108 to enter a specific email address or phone number.

Upon receiving the option 708 selected by the user 108 via the authentication interface 706, the identity decisioning server 106 may generate a one-time password, or according to some embodiments, obtain the password from another computer device configured to generate the password. The one-time password can include any combination of letters, numbers, and/or other characters. In some embodiments, the one-time password may be randomly generated, so that the password is unique to each one-time password authentication exam generated for the identity decisioning process. According to some embodiments, the identity decisioning server 106 may request the one-time password from the other computer device upon receiving a selected one of the delivery options 708 via the one-time password interface 706, and send the received password to the user 108 using the selected delivery option 708. In other embodiments, the identity decisioning server 106 may instruct the other computer device to send the one-time password directly to the user 108 using the selected delivery option 708.

As shown in FIG. 8, the authentication interface 806 includes a data entry field 808 for enabling the user 108 to enter the one-time password (also referred to herein as a "confirmation code") received through the selected delivery option 708. The authentication interface 806 further includes a submit option 812 for submitting or sending the entered password to the identity decisioning server 106 for evaluation (e.g., in accordance with the providing (224) interaction shown in FIG. 2). The one-time password authentication exam may be complete once the user 108 selects the submit option 812. As shown, the interface 806 may also include a second submit option 814 for situations where the user 108 has not met an expected threshold required to pass the exam or otherwise fails to meet certain requirements to pass (e.g., enter the correct confirmation code). The second submit option 814 enables the user 108 to continue on to additional ways or opportunities to authenticate themselves, if available.

As shown in FIG. 2, the sequence 200 further includes the identity decisioning server 106 determining (226) an outcome of the at least one authentication exam based on the responses received from the user device 102 in association with each exam (e.g., via the knowledge-based authentication interface 506, the additional authentication interface 606, and/or the one-time password interface 806). In some cases, the identity decisioning server 106 may compare the user responses received from the user device 102 to an answer key for the authentication exam to determine whether the user 108 passed the authentication exam. As an example, for the knowledge-based authentication exam presented by the interface 506, the answer key may include the correct answer 510 to each of the questions 508. And for the one-time password exam presented by the interfaces 706 and 806, the answer key may include the one-time password delivered to the selected delivery option 708. According to some embodiments, the outcome of the at least one authentication exam can determine whether additional authentication exams are necessary. For example, if the user 108 did not correctly answer one or more questions 508 of the knowledge-based authentication exam presented by the interface 506, the identity decisioning server 106 may decide to administer an additional authentication exam, such as, for example, the additional knowledge-based authentication exam shown in FIG. 6, or the one-time password exam shown in FIGS. 7 and 8.

According to embodiments, the sequence 200 additionally includes the identity decisioning server 106 determining (228) an overall identity decisioning result for the identity decisioning process. In some cases, the identity decisioning server 106 determines (228) the identity decisioning result based on the outcome determined (226) for the at least one authentication exam. For example, if the user 108 passes the at least one authentication exam, the identity decisioning result may be a "success result," and if the user 108 fails the exam, the identity decisioning result may be a "fail result." In other cases, the identity decisioning server 106 determines (228) the identity decisioning result based on the outcome of the identity verification stage, if the identity verification stage is sufficient to confirm the identity of the user 108. For example, if user 108 passes the identity verification stage, the identity decisioning result may be a "success result."

According to some embodiments, the sequence 200 further includes the identity decisioning server 106 reporting (230) the identity decisioning result to the transacting server 104. Upon receiving the identity decisioning result, the transaction server 104 determines (232) whether to permit the user transaction based on the received result. Once the determination (232) is made, the transacting server 104 provides (234) to the user device 102 (or causes the user device 102 to display) a transaction status screen corresponding to whether or not the user transaction is permitted.

In some cases, in addition to reporting (230) the result to the transacting server 104, the identity decisioning server 106 also provides (236) the identity decisioning result to the user device 102. In such cases, the identity decisioning server 106 may cause the user device 102 to display (238) the identity decisioning result on the display of the user device 102. In some cases, the display (238) may occur before or while the transaction server 104 determines (232) whether to permit the user transaction based on the identity decisioning result. And once the determination (232) is made, the displayed (238) result may be replaced with the transaction status screen provided (234) by the transaction server 104. In other cases, the sequence 200 may end with the display (238) of the identity decisioning result on the user device 102, instead of displaying a transaction status screen provided by the transaction server 104. And if the result is a success result, the user 102 may continue the transaction initiated in the first application window 402 by, for example, closing the second application window 404. In such cases, the transaction server 104 may cause the user device 102 to display a new interface (e.g., a transaction status screen) in the first application window 402.

Figure 9:
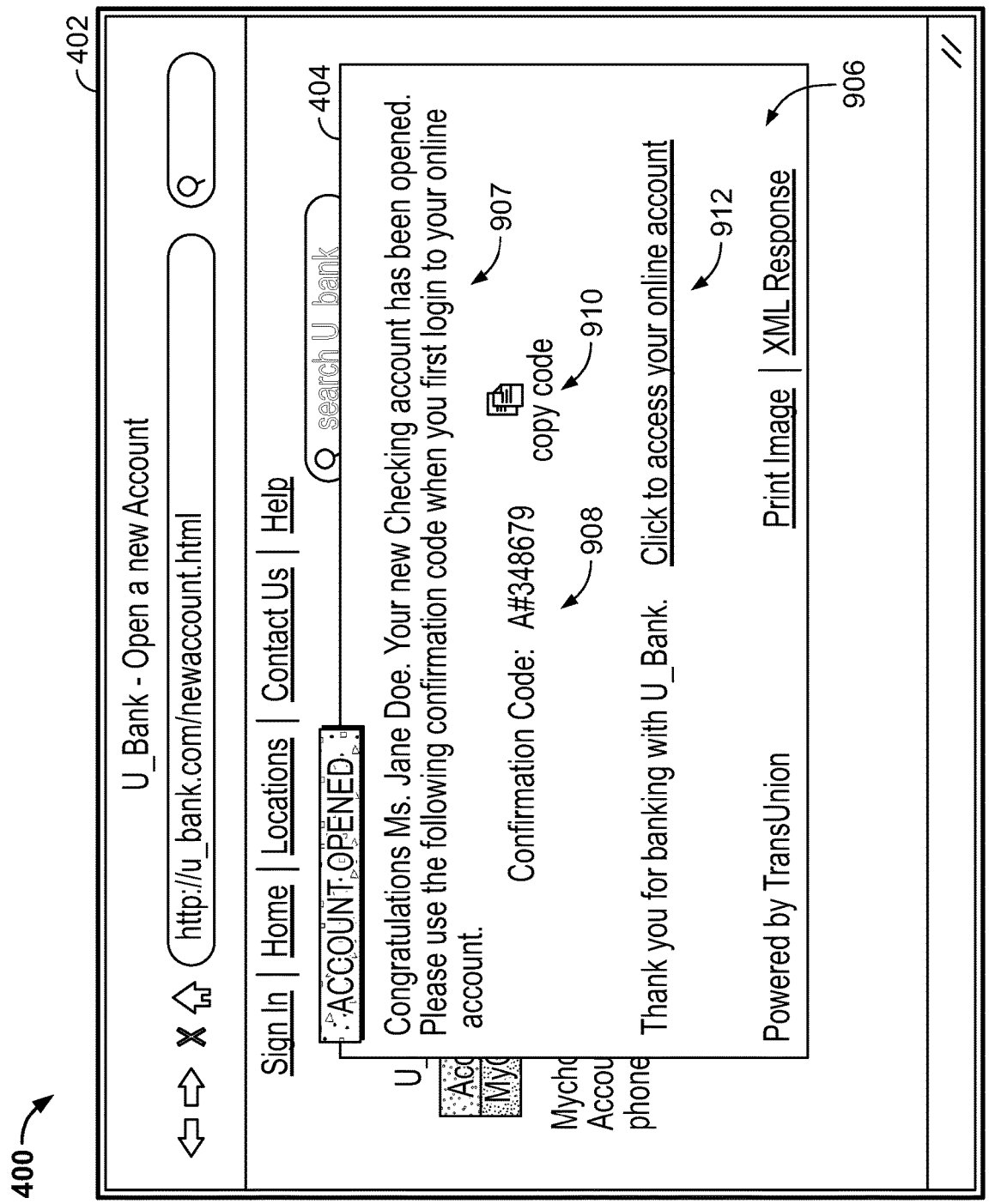
Figure 10:
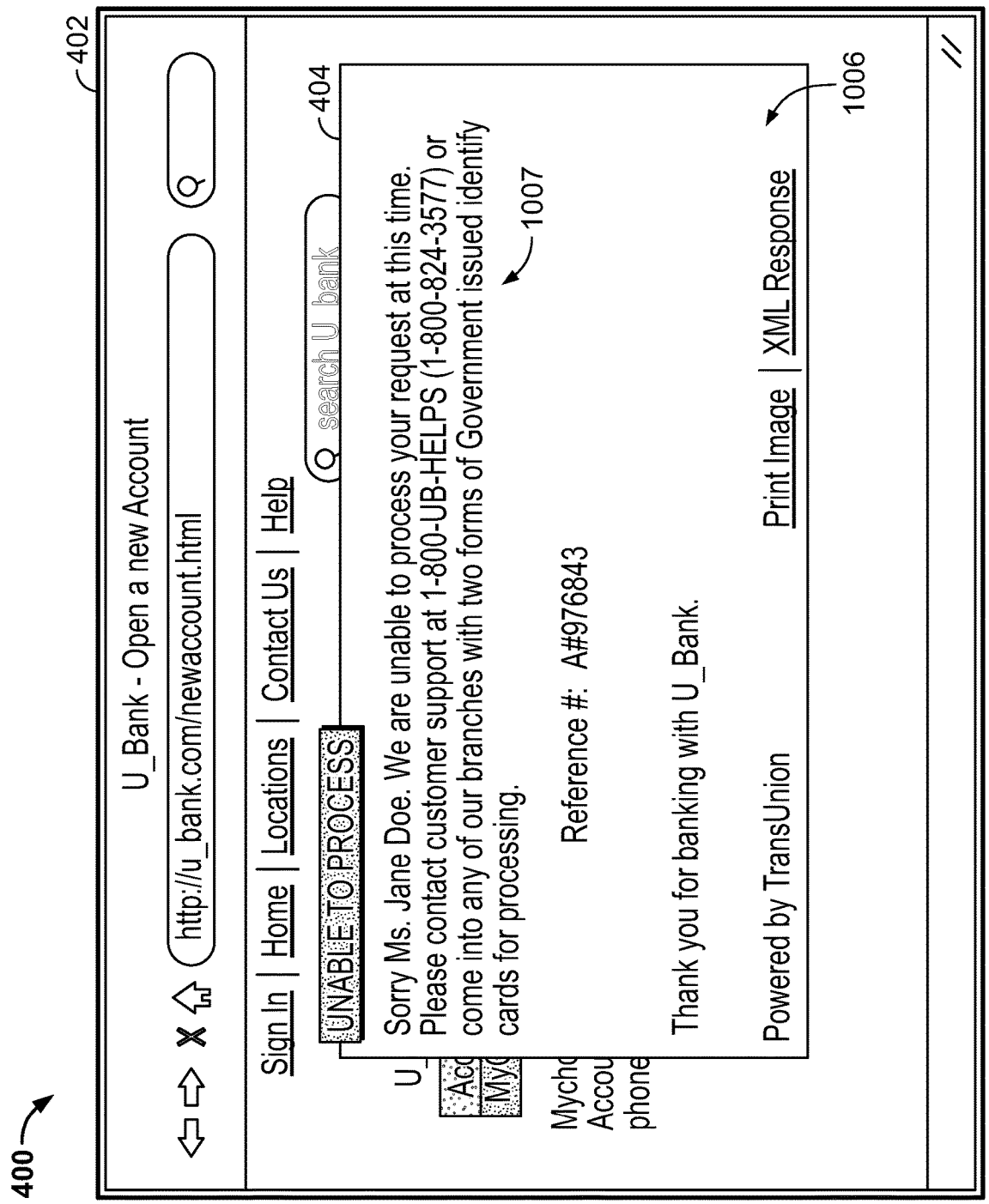

Referring now to FIGS. 9 and 10, shown are example decisioning status interfaces 906 and 1006 presented by or within the second application window 404 in accordance with some embodiments. As illustrated, the decisioning status interface 906 may be presented to the user 108 via the user device 102 once the identity of the user 108 has been successfully confirmed by the identity decisioning server 106. And the decisioning status interface 1006 may be presented to the user 108 via the user device 102 if the identity of the user cannot be confirmed or validated by the identity decisioning server 106. In some cases, the decisioning status interfaces 906 and/or 1006 may be provided (234) by the transaction server 104 as transaction status screens upon determining (232) whether to permit the user transaction. In other cases, the decisioning status interfaces 906 and/or 1006 may be provided (236) by the identity decisioning server 106 to the user device 102 for display (238) of the identity decisioning result thereon. According to some embodiments, the sequence 200 ends upon displaying either of the decisioning status interfaces 906 and 1006. Once the sequence 200 ends, interaction between the identity decisioning entity 114 and the user 108 may also end.

As shown in FIG. 9, the decisioning status interface 906 provides a congratulatory message 907 notifying the user 108 that the identity decisioning process was successfully performed. The interface 906 further provides a confirmation code 908 and a copy code option 910 to enable the user 108 to copy the confirmation code 908 to a temporary storage location of the user device 102. The decisioning status interface 906 also includes an account access option 912 to enable the user 108 to access an account with the transacting entity 110. According to embodiments, selection of the account access option 912 can cause the second application window 404 to close and can cause a new interface (not shown) to be presented within the first application window 402. The new interface may be associated with accessing the user's account (e.g., a new account or an existing account with the transacting entity 110), accessing an application or website (e.g., one associated with transacting entity 110), or otherwise completing the transaction initially requested (204) by the user 108.

According to embodiments, the new interface may require entry of the confirmation code 908 to ensure that the person using the new interface is the same as the user 108 that successfully completed the identity decisioning process. In some embodiments, the confirmation code 908 may be similar to the one-time password and may be randomly generated by the identity decisioning server 106, the transacting server 104, and/or other computer device. In some embodiments, the confirmation code aspect of the decisioning status interface 906 is only presented in certain predetermined cases as a final step of the identity decisioning process, such as, for example, if the identity authentication stage is not performed because the user 108 passed the identity verification stage. In other embodiments, the decisioning status interface 906 may not include the confirmation code aspect at all and instead, may include only the congratulatory message 907 and the access account option 912.

As shown in FIG. 10, the decisioning status interface 1006 provides an error message 1007 notifying the user 108 that the transaction could not be processed. Once the user 108 reaches the decisioning status interface 1006, the identity decisioning process may end, and the user 108 may not be granted access or permission to complete the transaction initially requested (204) at the start of the sequence 200.

In some embodiments, an additional decisioning sequence (not shown) may be conducted after completion of the identity decisioning sequence 200 to complete the transaction with the transacting entity 110. For example, after validating the identity of the user based on the sequence 200, the transacting entity 110 and the user 108 may enter a decisioning sequence, via the transacting server 104 and the user device 102, respectively, related to completing a purchase or otherwise obtaining a new product (e.g., a new credit card, a new debit card, etc.), selecting an appropriate product (e.g., an insurance policy, a healthcare policy, etc.), obtaining sensitive or personal information (e.g., a credit rating report, financial records, insurance records, health records, educational records, etc.), completing an examination (e.g., a standardized test, an entrance or qualification exam, a professional exam, etc.), or otherwise conducting business with the transacting entity 110.

Figure 11:
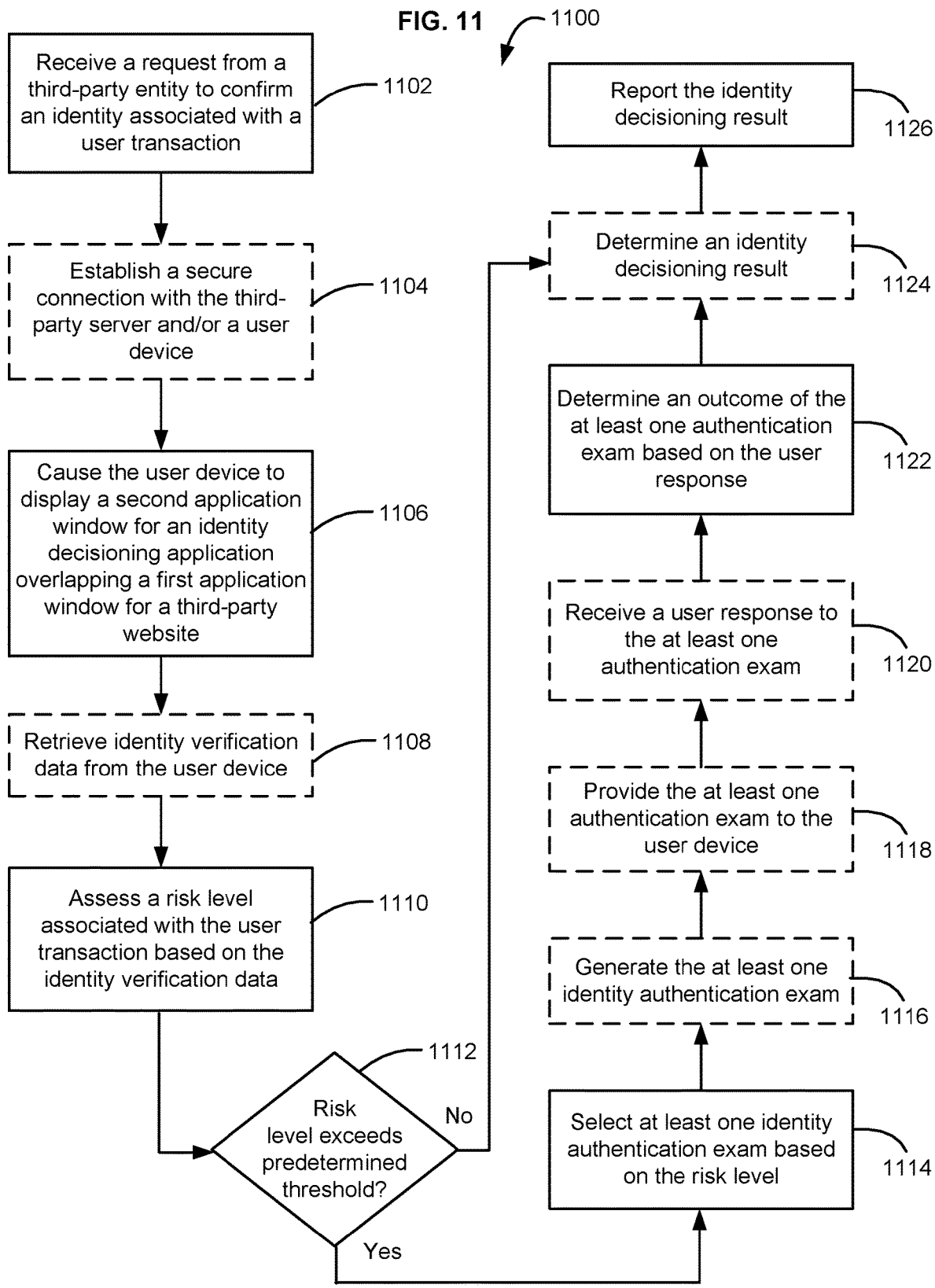
FIG. 11 is a flow diagram illustrating an exemplary process for implementing dynamic identity decisioning, in accordance with embodiments.

Now referring to FIG. 11, a flow chart illustrates an example method 1100 for an electronic device to confirm an identity of a user (e.g., the user 108) attempting a transaction at a third-party website hosted by a third-party server (e.g., the transaction server 104) in accordance with embodiments. It is understood that the order of the steps of the depicted flowchart of FIG. 11 can be in any order, and certain ones can be eliminated, and/or certain other ones can be added depending upon the implementation. The method 1100 can be implemented in software, firmware, hardware, or any combination thereof.

In embodiments, the electronic device may be a server (e.g., the identity decisioning server 106) associated with an identity decisioning entity (e.g., such as the identity decisioning entity 114). It should be appreciated that the functionalities of the method 1100 can be implemented with the electronic device executing an application and interfacing with a remote user device, such as the user device 102, over a network connection (e.g., the Internet). In embodiments, the application may be the dynamic decisioning application or a portion thereof, and the method 1100 may be a dynamic identity decisioning process. In some embodiments, the application may be a computer program stored on a non-transitory computer readable medium that is executable by a processor of the electronic device. In some cases, the electronic device includes a memory for storing the program code, the memory being communicatively coupled to the processor.

In some embodiments, at least a portion of the computer program may be executed by a processor of the remote user device. According to embodiments, the user device can include a memory for storing the portion of the program code, a display for displaying application windows associated with the application and/or the third-party website, and/or one or more input devices for receiving inputs from a user or another electronic device. Further, each of the memory, the display, and/or the input devices can be communicatively coupled to the processor. In embodiments, the third-party website may be presented or displayed in a first application window (e.g., as shown in FIG. 3) on the display of the user device.

The method 1100 can begin at step 1102, where a request to confirm a user identity is received from a third-party entity (e.g., the transacting entity 110). In some embodiments, the method 1100 further includes step 1104, in which a secure connection is established between the server and at least one of the third-party server or the user device. The secure connection may be established using any of a number of known techniques for securing communication between two or more network-connected devices, such as, for example, digital certificate exchanges, or exchange of keys, establishing tokens, etc. At step 1106, upon receiving the identity confirmation request from the third-party server, the server can cause the user device to display a second application window (e.g., the window 404) for presenting a dynamic decisioning application. The second application window can be presented on top of, or overlapping, the first application window (e.g., the window 402) for presenting the third-party website, without completely covering or closing the first window. According to embodiments, the second application window may be implemented as a "pop-up" window, as an iFrame, or using any other known technique for presenting the second application window without closing the first application window.

In some embodiments, the method 1100 further includes step 1108, which may begin an identity verification stage of the identity decisioning process. According to some embodiments, the identity verification stage includes the steps 1108, 1110, and 1112 of the method 1100. At step 1108, the identity verification data is retrieved from the user device, either passively (e.g., by automatically retrieving information from the user device) or actively (e.g., by requesting the user to provide information through one or more data entry interfaces associated with the dynamic decisioning application). As described herein, the identity verification data can include, for example, passive information, such as, device identification information and/or environmental information (e.g., location or timestamp information). As another example, the identity verification data can include login information, such as, a username and password for a user account associated with the dynamic decisioning application, the transacting website, or other application/website. As yet another example, the identity verification data can include personally identifying information (PII), such as a full name of the user, an address, a social security number, and other known types of personal information.

According to embodiments, the method 1100 further includes assessing a risk level associated with the transaction based on the identity verification data retrieved from the user device, for example, at step 1108. The risk level of the transaction may be selected from a list including two or more of the following: a high risk level, a medium risk level, a low risk level, or a zero risk level. Other formats for representing the risk level may also be used, as will be appreciated.

Figure 12:
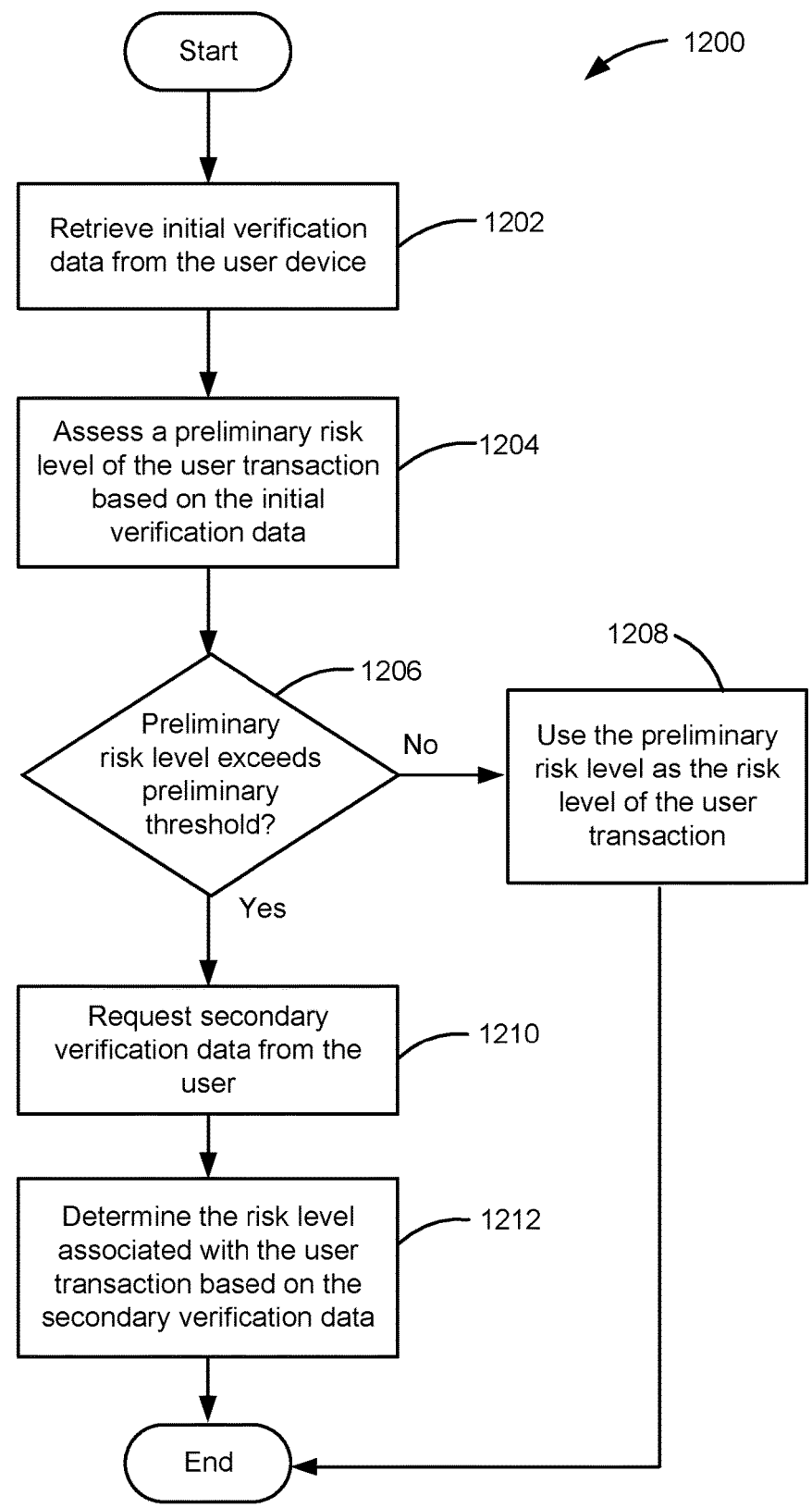
FIG. 12 is a flow diagram illustrating an example sub-process of the decisioning process shown in FIG. 11, in accordance with embodiments.

Now referring to FIG. 12, a flow chart illustrates an example method 1200 of retrieving identity verification data from the user device and assessing a risk level associated with the transaction in accordance with embodiments. In some embodiments, the method 1200 may be considered a sub-process included within the method 1100 at, or in place of, steps 1108 and 1110. For example, the method 1200 may represent a portion of the identity verification stage included in the identity decisioning process provided by the method 1100, the identity verification stage also including the step 1112 of the method 1100. In other embodiments, the method 1200 can be a stand-alone method of determining a risk level of a user transaction based on identity verification data retrieved from the user device. It is understood that, as with FIG. 11, the order of the steps of the depicted flowchart of FIG. 12 can be in any order, and certain ones can be eliminated, and/or certain other ones can be added depending upon the implementation. Further, the method 1200 can be implemented in software, firmware, hardware, or any combination thereof.

In the illustrated embodiment, the identity verification data includes initial verification data and secondary verification data, wherein the initial verification data includes at least one of device information or login information, and the secondary verification data includes personally identifying information. At step 1202, the initial verification data is automatically retrieved from the user device. At step 1204, a preliminary risk level of the user transaction is assessed based on the initial verification data. At step 1206, a determination is made as to whether the preliminary risk level exceeds a preliminary threshold. According to embodiments, the preliminary risk level may be selected from a list including a high risk level, a medium risk level, a low risk level, and a zero risk level. Further, in some embodiments, the preliminary threshold may be a zero risk level.

If the determination at step 1206 is no (e.g., the preliminary risk level does not exceed the preliminary threshold), then the method 1200 continues to step 1208. At step 1208, the preliminary risk level is assigned to, or used as, an overall risk level of the transaction. For example, is the preliminary risk level assessed at step 1204 is zero, the determination at step 1206 would be "no," and at step 1208, the transaction would be assigned an overall risk level of zero. The method 1200 may end after step 1208 and the method 1100 may resume from step 1112.

If the determination at step 1206 is yes (e.g., the preliminary risk level exceeds the preliminary threshold), then the method 1200 continues to step 1210. At step 1210 the secondary verification data is specifically requested from the user, for example, through a verification interface for obtaining personally identifying information (e.g., the interface 406) displaying in the second application window. At step 1212, the overall risk level of the transaction is determined based on the secondary verification data. In some embodiments, the overall risk level is selected from the same list as the preliminary risk level. Once the risk level is assessed at step 1212, the method 1200 may end and the method 1100 may resume from step 1112.

Referring back to FIG. 11, at step 1112, a determination is made as to whether the risk level assessed at step 1110 or the overall risk level determined by the method 1200 exceeds a predetermined threshold. According to embodiments, the predetermined threshold may be at least one of a low risk level or a zero risk level. If the determination at step 1112 is yes (e.g., the risk level exceeds the predetermined threshold), the method 1100 continues to step 1114, where the identity authentication stage of the identity decisioning process begins. If the determination at step 1112 is no (e.g., the risk level does not exceed the predetermined threshold), the method 1100 continues to step 1124, which is discussed in more detail below. For example, if the predetermined threshold is a low risk level and the risk level determined at step 1110 is a low risk level, the determination at step 1112 will be no, and the method 1100 will continue to step 1124. As another example, if the risk level is a high risk level, the determination at step 1112 will be yes, and the method 1100 will continue to step 1114. In embodiments, the identity verification stage of the identity decisioning process may end once step 1112 is complete.

At step 1114, at least one identity authentication exam is selected for presentation to the user through the second application window. In embodiments, the number and type of identity authentication exam is selected from a list of authentication exams based on the risk level determined at step 1110 or by the method 1200. As described herein, the list of authentication exams can include a knowledge-based authentication exam, a one-time password exam, or any other type of authentication exam. As an example, if the risk level determined at step 1110 is a high risk level, at least two different authentication exams may be selected at step 1114 (e.g., the knowledge-based authentication exam and the one-time password exam). As another example, if the risk level is a medium risk level, the knowledge-based authentication exam may be selected at step 1114.

In some embodiments, the method 1100 further includes, at step 1116, generating the at least one identity authentication exam based on information stored in a database (e.g., the identity decisioning database 116). In other embodiments, the exams may be pre-generated and retrieved from the database as needed. In some embodiments, the method 1100 includes step 1118, in which the at least one authentication exam is provided to the user device for presentation in the second application window. As an example, the authentication exam may be presented as a knowledge-based authentication interface (e.g., the 506) or as a one-time password interface (e.g., interfaces 706 and 806). The method 1100 may also include step 1120, in which a user response to the at least one authentication exam is received from the user device, for example, through the interfaces provided at 1118.

At step 1122, an outcome of the at least one authentication exam is determined based on the user response thereto. As described herein, the outcome may be a passing outcome if the user passes the at least one authentication exam or a failing outcome if the user fails the exam. In some embodiments, the method 1100 further includes, at step 1124, determining an identity decisioning result based on the outcome of the at least one authentication exam, or the overall risk level of the transaction if the overall risk level does not exceed the predetermined threshold at step 1112. The identity decisioning result may be a success result if the user passes the exam or has an overall risk level that does not exceed the predetermined threshold. Further, the identity decisioning result may be a fail result if the user does not pass the exam. For example, if the overall risk level is a low risk level and the predetermined threshold is a zero risk level, the low risk level is used at step 1124 to determine that the identity decisioning result is a success result. As another example, if the outcome of the at least one authentication exam is a failing outcome, the identity decisioning result determined based thereon will be a fail result.

At step 1126, the identity decisioning result is reported to the third-party server. If the result is a success result, the third-party website permits the user to complete transaction. And if the result is a fail result, the third-party website prevents the user from completing the transaction. In some cases, the identity decisioning result may be presented to the user through the second application window by the identity decisioning server, for example, through a decisioning status interface (e.g., interfaces 906 and 1006). In other cases, the third-party server may cause the second application window to close and return the user back to the first application window on the third-party website for either continuing with the transaction or reporting the fail result of the identity decisioning process. In embodiments, the method 1100 ends upon reporting the identity decisioning result.

FIG. 13 is a block diagram of a computing device 1300 that houses executable software used to facilitate the system 100. One or more instances of the computing device 1300 may be utilized by, or utilized to implement, any, some, or all of the electronic devices in the networked system 100, namely the user device 102, the transaction server 104, or the identity decisioning server 106, or any other computer or server associated with the system 100. Thus, the computing device 1300 may be representative of any computer utilized within, or to implement, the system 100, and includes any type of computing device, including one or more special or general purpose digital computer(s), such as a mainframe computer, a personal computer (desktop, laptop, tablet-type, or otherwise), a workstation, a minicomputer, a computer network, a "virtual network," a "internet cloud computing facility," a personal digital assistant, a smartphone, or other handheld or mobile computing device. In one embodiment, the computing device 1300 may be configured to exchange information with one or more components of the system 100 in accordance with the principles disclosed herein.

According to embodiments, the computing device 1300 includes a processing hardware 1302 that includes a memory 1304. As shown in FIG. 13, the computing device 1300 also includes a processor 1306 communicatively coupled to the memory 1304, and an input and/or output (I/O) portion 1308 communicatively coupled to the processor 1306. The computing device 1300 can further include an interactive hardware portion 1310. The interactive hardware portion 1310 is coupled to the I/O portion 1308 such that a command or other input entered or provided by a user through the interactive hardware portion 1310 will be forwarded to the I/O portion 1308, to the processor portion 1306, and then to the memory portion 1304.

As shown in FIG. 13, the interactive hardware portion 1310 can include one or more input devices 1312 (e.g., a keyboard, a mouse, a touch screen, a microphone, a stylus, a radio-frequency device reader, and the like) for receiving inputs from the user or other sources, a display device 1314 for displaying content to the user on the computing device 1300, and/or a communications module 1316 comprising one or more transceivers and/or other devices for communicating with one or more networks (e.g., a wide area network (including the Internet), a local area network, a GPS network, a cellular network, a Bluetooth network, and the like).

The processor 1306 can be a hardware device for executing software, particularly software stored in the memory 1304, some of which may or may not be unique to the system 100. The processor 1306 can be any custom-made or commercially available processor, a central processing unit (CPU), an auxiliary processor among several processors associated with the computing device 1300, a semiconductor-based microprocessor (in the form of a microchip or chip set), another type of microprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor 1306 may also represent a distributed processing architecture such as, but not limited to, SQL, Smalltalk, APL, KLisp, Snobol, Developer 200, MUMPS/Magic.

The memory 1304 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1304 may incorporate electronic, magnetic, optical, and/or other types of storage media. The memory 1304 can have a distributed architecture where various components are situated remote from one another, but are still accessed by the processor 1306. The memory 1304 may store software that includes one or more separate programs comprising ordered listings of executable instructions for implementing logical functions.

When the computing device 1300 is in operation, the CPU portion 1306 can be configured to execute software stored within the memory 1304, to communicate data to and from the memory 1304, and to generally control operations of the computer 1300 pursuant to the software. In some embodiments, the memory 1304 includes a non-transitory computer readable medium for implementing all or a portion of the methods 1100 and 1200, and/or the sequence 200. The memory portion 1304 may also be utilized to implement at least part of one or more databases utilized by the system 100. In one embodiment, the memory 1304 stores one or more executable computer programs, such as, for example, a dynamic decisioning application 1318, which may be executed by the computer processor 1306 to carry out the principles disclosed herein (e.g., one or more of the methods 1100 and 1200 and/or the sequence 200). The executable programs can be implemented in software, firmware, hardware, or a combination thereof.

According to some aspects, the memory 1304 also stores at least part of a database 1320. In one embodiment, the memory 1304 stores the database 1320 and the dynamic decisioning application 1318. In another embodiment, the database 1320 and the dynamic decisioning application 1318 are stored in different memories on different computers or servers. The database 1320 may include information related to or used by the dynamic decisioning application 1318 to carry out the principles disclosed herein. To that extent, the dynamic decisioning application 1318 may be in communication with the database 1320 and may extract information from or store information in the database 1320, as needed. According to some embodiments, the database 1320 may include all or portions of the identity decisioning database 116 and/or the transaction database 112 shown in FIG. 1. In some embodiments, all or portions of the database 1320, the identity decisioning database 116, and/or the transaction database 112 may be stored on a cloud server and may be accessible by the identity decisioning server 106, the transaction server 104, and/or any other computing device 1300 to carry out the dynamic decisioning techniques disclosed herein.

The memory 1304 also includes an operating system 1322 for controlling the execution of other computer programs, such as the dynamic decisioning application 1318, and provides scheduling, input-output control, file and data management, memory management, and communication control and related services. A non-exhaustive list of examples of suitable commercially available operating systems 1322 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., Windows CE available from Microsoft Corporation, iOS available from Apple, Inc.).

The dynamic decisioning application 1318 may be a source program, executable program (object code), script, or any other entity comprising a set of instructions to be performed. When a "source" program, the program needs to be translated via a compiler, assembler, interpreter, or the like, which may or may not be included within the memory 1304, so as to operate properly in connection with the operating system 1322. Furthermore, the operating system 1322 can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, .Net, HTML, and Ada.

If the computing device 1300 is a PC, workstation, PDA, or the like, the software in the memory 1304 may further include a basic input output system (BIOS) (not shown in FIG. 13). The BIOS is a set of essential software routines that initialize and test hardware at startup, start the operating system 1322, and support the transfer of data among the hardware devices. The BIOS is stored in ROM so that the BIOS can be executed when computing device 1300 is activated.

When the methods 1100 and 1200 are implemented in software, it should be noted that the methods 1100 and 1200 can be stored on any computer readable medium for use by or in connection with any computer related system or method, although in one preferred embodiment, the methods 1100 and 1200 are implemented in a centralized application service provider arrangement. In the context of this document, a computer readable medium is an electronic, magnetic, optical, or other physical device or means that can contain or store a computer program for use by or in connection with a computer related system or method. The methods 1100 and 1200 can be embodied in any type of computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" may be any means that can store, communicate, propagate, or transport the program for use by or in connection with the instruction execution system, apparatus, or device. The computer readable medium may be, for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In another embodiment, where the methods 1100 and 1200 are implemented in hardware, the methods 1100 and 1200 may also be implemented with any of the following technologies, or a combination thereof, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in figures should be understood as representing modules, segments, or portions of code which include one or more executable instructions for implementing specific logical functions or steps in the process, and alternate implementations are included within the scope of the embodiments described herein. For example, functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method by a server having a processor and being in communication with a third-party server and a user device of a user, the method comprising:
receiving, at the processor, a request from the third-party server to confirm an identity of the user, the user attempting a transaction through a third-party website displayed in a first application window on the user device;
displaying, on the user device and using the processor, a second application window presenting an identity decisioning application, the second application window at least partially overlapping the first application window displayed on the user device;
determining, using the processor, a risk level associated with the transaction based on identity verification data retrieved from the user device via the identity decisioning application;
determining, using the processor, an identity decisioning result based on the risk level associated with the transaction; and
presenting, using the processor, the identity decisioning result to the user via the second application window displayed on the user device,
wherein determining the identity decisioning result comprises:
determining whether the risk level exceeds a predetermined threshold;
upon determining that the risk level exceeds the predetermined threshold:
selecting, by the processor, at least one identity authentication exam from a list of authentication exams based on the risk level of the transaction, the user device presenting the at least one identity authentication exam to the user via the second application window displayed on the user device,
determining, by the processor, an outcome of the at least one identity authentication exam based on a user response thereto, and
determining, by the processor, the identity decisioning result based on the outcome of the at least one authentication exam; and
upon determining that the risk level does not exceed the predetermined threshold, determining, by the processor, the identity decisioning result based on the risk level associated with the transaction.

2. The method of claim 1, further comprising: sending, using the processor, the identity decisioning result to the third-party server.

3. The method of claim 1, wherein determining the identity decisioning result further comprises selecting, by the processor, a success result for the identity decisioning result upon determining that the risk level does not exceed the predetermined threshold or the outcome of the at least one authentication exam is a passing outcome, the third-party website enabling the user to complete the transaction if the identity decisioning result is the success result.

4. The method of claim 1, wherein determining the risk level comprises: selecting, by the processor, the risk level of the transaction from a list comprising two or more of the following: a high risk level, a medium risk level, a low risk level, or zero risk level, and setting, by the processor, the predetermined threshold to be the lowest risk level in the list.

5. The method of claim 1, wherein the list of authentication exams comprises at least one of a knowledge-based authentication exam and a one-time password exam.

6. The method of claim 1, wherein selecting at least one authentication exam comprises selecting, by the processor, at least two authentication exams upon determining that the risk level is a high risk level.

7. The method of claim 1, further comprising generating, by the processor, the at least one authentication exam.

8. The method of claim 1, further comprising providing, using the processor, the at least one authentication exam to the user device, the user device presenting the at least one authentication exam to the user through the identity decisioning application presented on the user device.

9. The method of claim 1, wherein the identity verification data comprises at least one of passive information, login information, and personally identifying information.

10. The method of claim 9, wherein the login information comprises a username and password associated with the identity decisioning application, the login information provided to the processor by the user through the identity decisioning application.

11. The method of claim 9, wherein the passive information comprises device identification information associated with the user device, the processor automatically retrieving the device identification information from the user device.

12. The method of claim 9, wherein the passive information comprises environmental parameters associated with the transaction, the processor automatically retrieving the environmental parameters from the user device, and the environmental parameters comprising at least one of a timestamp associated with initiation of the transaction and a location of the user device.

13. The method of claim 9, wherein the personally identifying information comprises at least one of a full name, an address, and a social security number.

14. The method of claim 1, wherein the identity verification data comprises an initial verification data and a secondary verification data, and determining the risk level associated with the transaction comprises:
retrieving, using the processor, the initial verification data from the user device;
determining, by the processor, a preliminary risk level of the transaction based on the initial verification data;
upon determining that the preliminary risk level exceeds a preliminary threshold:
requesting, using the processor, the secondary verification data from the user through the identity decisioning application presented on the user device, and
determining, by the processor, the risk level associated with the transaction based on the secondary verification data; and
upon determining that the preliminary risk level does not exceed the preliminary threshold, assigning, by the processor, the preliminary risk level as the risk level of the transaction.

15. The method of claim 14, wherein the initial verification data comprises at least one of device identification information and login information, and the secondary verification data comprises personally identifying information.

16. The method of claim 14, wherein the preliminary threshold is a zero risk level.

17. A system comprising:
a communication module in network communication with a third-party server and a user device of a user;
a memory storing a program code; and
a processor in communication with the memory and the communication module,
wherein the program code comprises instructions that, when executed by the processor, cause the processor to perform the steps of:
receiving a request, from the third-party server, to confirm an identity of the user, the user attempting a transaction through a third-party website displayed in a first application window on the user device;
displaying, on the user device, a second application window presenting an identity decisioning application, the second application window at least partially overlapping the first application window displayed on the user device;
determining a risk level associated with the transaction based on identity verification data retrieved from the user device;
determining an identity decisioning result based on the risk level associated with the transaction; and
presenting the identity decisioning result to the user via the second application window displayed on the user device,
wherein determining the identity decisioning result comprises:
determining whether the risk level exceeds a predetermined threshold;
upon determining that the risk level exceeds the predetermined threshold:
selecting at least one identity authentication exam from a list of authentication exams based on the risk level of the transaction, the user device presenting the at least one identity authentication exam to the user via the second application window displayed on the user device,
determining an outcome of the at least one identity authentication exam based on a user response thereto, and
determining an identity decisioning result based on the outcome of the at least one authentication exam; and
upon determining that the risk level does not exceed the predetermined threshold, determining the identity decisioning result based on the risk level associated with the transaction.

18. The system of claim 17, wherein the program code further comprises instructions that, when executed by the processor, cause the processor to perform the step of sending the identity decisioning result to the third-party server.

19. The system of claim 17, wherein determining the identity decisioning result further comprises selecting a success result for the identity decisioning result if the risk level does not exceed the predetermined threshold or if the outcome of the at least one authentication exam is a passing outcome, the third-party website enabling the user to complete the transaction if the identity decisioning result is the success result.

20. The system of claim 17, wherein the program code further comprises instructions that, when executed by the processor, cause the processor to perform the step of generating the at least one authentication exam.

21. The system of claim 17, wherein the program code further comprises instructions that, when executed by the processor, cause the processor to perform the step of providing the at least one authentication exam to the user device, the user device presenting the at least one authentication exam to the user through the identity decisioning application presented on the user device.

22. The system of claim 17, wherein the program code further comprises instructions that, when executed by the processor, cause the processor to perform the step of establishing a secure connection with at least one of the third-party server and the user device prior to displaying the second application window on the user device.

23. A non-transitory computer readable medium having a computer program stored thereon, the computer program comprising instructions which, when executed by a processor of a server in communication with a third-party server and a user device of a user, cause the processor to:
receive a request, from the third-party server, to confirm an identity of the user, the user attempting a transaction through a third-party website displayed in a first application window on the user device;
display, on the user device, a second application window presenting an identity decisioning application, the second application window at least partially overlapping the first application window displayed on the user device;

determine a risk level associated with the transaction based on identity verification data retrieved from the user device;

determine an identity decisioning result based on the risk level associated with the transaction; and present the identity decisioning result to the user via the second application window displayed on the user device, wherein determine the identity decisioning result comprises:

determine whether the risk level exceeds a predetermined threshold;

upon determining that the risk level exceeds the predetermined threshold:

select at least one identity authentication exam from a list of authentication exams based on the risk level of the transaction, the at least one identity authentication exam for presentation to the user via the second application window, determine an outcome of the at least one identity authentication exam based on a user response thereto, and determine an identity decisioning result based on the outcome of the at least one authentication exam; and upon determining that the risk level does not exceed the predetermined threshold, determine the identity decisioning result based on the risk level associated with the transaction.

24. The system of claim 17, wherein the list of authentication exams comprises at least one of a knowledge-based authentication exam and a one-time password exam.

* * * * *